United States Patent
Goodman

(10) Patent No.: US 11,402,634 B2
(45) Date of Patent: Aug. 2, 2022

(54) HAND-LOCKED RENDERING OF VIRTUAL OBJECTS IN ARTIFICIAL REALITY

(71) Applicant: Facebook Technologies, LLC, Menlo Park, CA (US)

(72) Inventor: Christopher James Goodman, Round Rock, TX (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/138,283

(22) Filed: Dec. 30, 2020

(65) Prior Publication Data
US 2022/0206298 A1 Jun. 30, 2022

(51) Int. Cl.
G02B 27/01 (2006.01)
G06F 3/01 (2006.01)
G06F 3/04815 (2022.01)
G02B 27/00 (2006.01)

(52) U.S. Cl.
CPC ....... *G02B 27/017* (2013.01); *G02B 27/0093* (2013.01); *G06F 3/012* (2013.01); *G06F 3/04815* (2013.01)

(58) Field of Classification Search
CPC ............. G01B 11/026; G02B 27/0093; G02B 27/0172; G02B 2027/0178; G02B 27/017; G06F 3/011; G06F 3/013; G06F 3/016; G06F 3/167; G06F 1/163; G06K 9/00671; G06T 7/70; H04N 13/344; H04N 13/383
See application file for complete search history.

(56) References Cited

U.S. PATENT DOCUMENTS

| | | | |
|---|---|---|---|
| 2014/0184496 A1* | 7/2014 | Gribetz | G06F 3/013 345/156 |
| 2017/0185141 A1 | 6/2017 | Shotton et al. | |
| 2019/0324595 A1* | 10/2019 | Katz | G06F 3/0304 |
| 2020/0143585 A1 | 5/2020 | Seiler et al. | |
| 2020/0372702 A1 | 11/2020 | Yan et al. | |
| 2020/0387221 A1* | 12/2020 | Ratcliff | G06F 3/167 |

OTHER PUBLICATIONS

International Search Report and Written Opinion for International Application No. PCT/US2021/065681, dated May 11, 2022, 9 pages.

\* cited by examiner

*Primary Examiner* — Nelson M Rosario
(74) *Attorney, Agent, or Firm* — Baker Botts L.L.P.

(57) ABSTRACT

In one embodiment, a method includes, by one or more computing devices, determining, based on first tracking data, a first viewpoint of the user and a first hand pose of the user. The method may include generating a virtual object in a virtual environment based on the first hand pose and a predetermined spatial relationship between the virtual object and the hand of the user. The method may include rendering a first image of the virtual object as viewed from the first viewpoint. The method may include determining, based on second tracking data, a second viewpoint of the user and a second hand pose. The method may include adjusting the first image of the virtual object based on changes from the first hand pose to the second hand pose. The method may include rendering and displaying a second image from the adjusted first image viewed from the second viewpoint.

20 Claims, 10 Drawing Sheets

HAND-LOCKED RENDERING OF VIRTUAL OBJECTS IN ARTIFICIAL REALITY

TECHNICAL FIELD

This disclosure generally relates to generating graphics for an artificial reality environment.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a method is performed by one or more computing systems of an artificial reality system. The computing systems may be embodied in a head-mounted display or a less portable computing system. The method includes determining, based on first tracking data associated with a first time, a first viewpoint of the user and a first hand pose of a hand of the user. The method may include generating a virtual object in a virtual environment based on the first hand pose and a predetermined spatial relationship between the virtual object and the hand of the user. The method may include rendering a first image of the virtual object as viewed from the first viewpoint. The method may include determining, based on second tracking data associated with a second time, a second viewpoint of the user and a second hand pose of the hand. The method may include adjusting the first image of the virtual object based on changes from the first hand pose to the second hand pose. The method may include rendering a second image based on the adjusted first image as viewed from the second viewpoint. The method may include displaying the second image. In particular embodiments, the predetermined spatial relationship between the virtual object and the hand of the user may be based on one or more anchor points relative to the hand of the user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
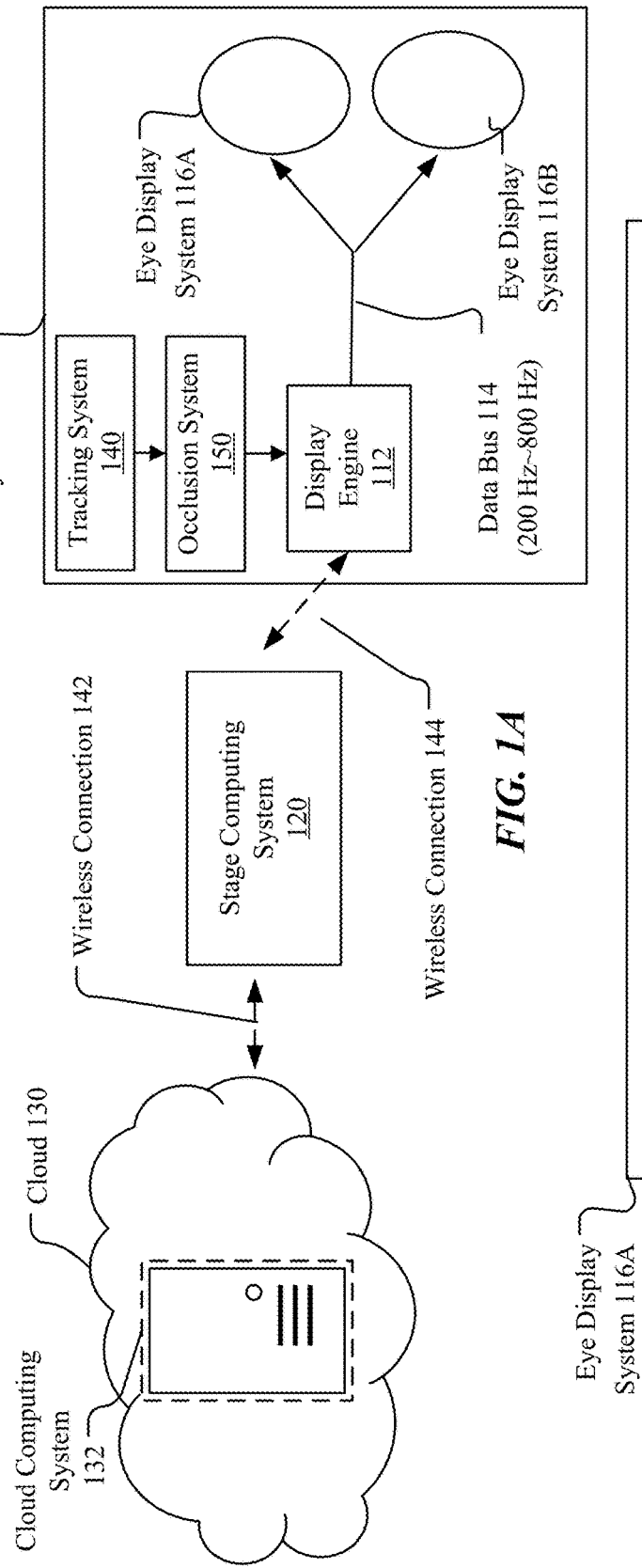
FIG. 1A illustrates an example artificial reality system.

In particular embodiments, a method is performed by one or more computing systems of an artificial reality system. The computing systems may be embodied in a head-mounted display or a less portable computing system. The method includes determining, based on first tracking data associated with a first time, a first viewpoint of the user and a first hand pose of a hand of the user. The method may include generating a virtual object in a virtual environment based on the first hand pose and a predetermined spatial relationship between the virtual object and the hand of the user. The method may include rendering a first image of the virtual object as viewed from the first viewpoint. The method may include determining, based on second tracking data associated with a second time, a second viewpoint of the user and a second hand pose of the hand. The method may include adjusting the first image of the virtual object based on changes from the first hand pose to the second hand pose. The method may include rendering a second image based on the adjusted first image as viewed from the second viewpoint. The method may include displaying the second image. In particular embodiments, the predetermined spatial relationship between the virtual object and the hand of the user may be based on one or more anchor points relative to the hand of the user.

In particular embodiments, the method may further include determining, based on the first tracking data associated with the first time, a first head pose of a head of the user. Generating the virtual object in the virtual environment may be further based on the first head pose. In particular embodiments, the method may further include determining, based on the second tracking data associated with the second time, a second head pose of a head of the user. Adjusting the first image of the virtual object may be further based on changes from the first head pose to the second head pose. In particular embodiments, adjusting the first image of the virtual object may include computing a three-dimensional transform for the first image of the virtual object in the virtual environment based on the changes from the first hand pose to the second hand pose and applying the three-dimensional transform to the first image of the virtual object in the virtual environment. Rendering the second image based on the adjusted first image may include generating a projection of the adjusted first image of the virtual object based on the second viewpoint.

In particular embodiments, adjusting the first image of the virtual object may include computing a visual deformation for the first image of the virtual object based on the changes from the first hand pose to the second hand pose and applying the visual deformation to the first image of the virtual object. Rendering the second image based on the adjusted first image may include rendering the deformed first image of the virtual object based on the second viewpoint. In particular embodiments, the visual deformation may include scaling the first image of the virtual object, skewing the first image of the virtual object, rotating the first image of the virtual object, or shearing the first image of the virtual object.

In particular embodiments, rendering the second image based on the adjusted first image as viewed from the second viewpoint may include updating a visual appearance of the first image of the virtual object based on the changes from the first hand pose to the second hand pose. In particular embodiments, the method further includes determining a portion of the virtual object occluded by the hand from the second viewpoint, where rendering the second image based on the adjusted first image as viewed from the second viewpoint may include generating instructions to not display a portion of the second image corresponding to the portion of the virtual object occluded by the hand. In particular embodiments, determining the portion of the virtual object occluded by the hand from the second viewpoint may include generating a virtual object representation of the hand in the virtual environment, the position and orientation of the virtual object representation of the hand being based on the second tracking data and the second viewpoint. The method may include projecting a ray into the virtual environment with an origin and a trajectory based on the second viewpoint. The method may include determining a point of intersection of the ray with the virtual object representation of the hand, where the ray intersects with the virtual object representation of the hand before intersecting with another virtual object In particular embodiments, the first image of the virtual object as viewed from the first viewpoint may be rendered by a first computing device of the one or more computing devices and the second image based on the adjusted first image as viewed from the second viewpoint may be rendered by a second computing device of the one or more computing devices. In particular embodiments, one of the one or more computing devices includes a head-mounted display. In particular embodiments, the method may include allocating the steps of the method between the computing device including the head-mounted display and another computing device of the one or more computing devices based on one or more metrics of available computing resources.

In particular embodiments the method may further include, after rendering the second image based on the adjusted first image as viewed from the second viewpoint, determining, based on third tracking data associated with a third time, a third viewpoint of the user and a third hand pose of the hand. The method may include adjusting the first image of the virtual object based on changes from the first hand pose to the third hand pose. The method may include rendering a third image based on the adjusted first image as viewed from the third viewpoint. The method may include displaying the third image.

This disclosure relates to, in particular embodiments, the problem of relating virtual objects and physical objects in a virtual environment being presented to a user. In augmented reality (AR), a virtual environment may be displayed to a user as an augmented layer on top of the real environment. This may be done by creating a correspondence or mapping of a viewpoint into the real environment to a viewpoint into the virtual embodiment. Embodiments of this disclosure relate to the task of efficiently rendering virtual objects in relation to physical objects, such as a user's hands. In particular, embodiments of this disclosure relate to a technique for so-called "hand-locked rendering" by which the pose of virtual objects presented to a user is determined based on a predetermined relationship to the pose of a user's hands or portions of the user's hands. The techniques may also be applicable to other physical objects detectable by a tracking system for virtual or augmented reality. While examples may be described herein as relating to a user's hands, persons of skill in the art will recognize that the techniques may be adapted to, as an example and not by way of limitation, other body parts of the user operating the artificial reality system, the bodies of other users detected by the artificial reality system, physical objects manipulated by the users detected by the artificial reality system, or other physical objects. Thus, where this disclosure uses the phrase "hand-locked rendering", it should be understood to encompass techniques for rendering virtual objects anchored to any of the above categories of objects as appropriate.

In particular embodiments, this disclosure provides techniques for a system capable of generating hand-locked virtual objects at sub-frame display rates according to hand pose and head pose information that may be updated at, or faster than, frame generation rates. Using the rendering techniques described herein, the artificial reality system may update an image of a virtual object, which may be rendered at a first frame rate, as updated information regarding the pose of a user's hands and head. The updates to the image of the virtual object can serve to enforce a positional or pose lock with an anchor point or other predetermined relationship to the user's hands. Using the sub-frame generation and rendering architecture described herein, the updates to the image of the virtual object can occur at faster rates than the original frame rate at which the image was generated. The updates can be further displayed at this faster sub-frame rate, which serves to improve the experience of a user engaging with the artificial reality system by improving the tracking fidelity of virtual objects in relation to physical objects manipulated by the user, including the user's hands.

The impact of the combination of the techniques described herein is to allow for a relatively straightforward method for application developers using an artificial reality system, especially developers that have more limited access to the programming interfaces offered by the artificial reality system than first-party developers, to develop artificial reality experiences having accurate and intuitive hand-locked virtual objects anchored to specific positions on a user's hand. For example, a virtual object such as a ring can be anchored to a user's finger. As another example, animated effects can be anchored to a user's fingertips. As yet another example, lighting effects can be anchored to a specific position on an object held by a user. As present, approaches for rendering virtual objects may require all virtual objects to be oriented relative to world coordinates or to a fixed origin or anchor point in the world. This greatly complicates the procedures used by virtual experience developers when trying to make dynamic effects relative to physical objects that may have a high rate of movement, such as a user's hand.

Furthermore, it is often difficult for artificial reality experience developers to support smooth animation of virtual objects that interact with a user's hands due to input and display lag. The complexity of the virtual object limits the rate at which it can be rendered using typical approaches. For example, to conserve power and ensure consistent rendering rates, the virtual objects may be limited to a standard rate (e.g., 30 frames per second (fps)) that is acceptable but far from optimal. Due to the time typically needed for an artificial reality system to render a frame, by the time the frame is ready to be displayed, the poses of physical objects that must be accounted for when displaying the frame, such as the user's hands and head, likely would have changed. This means that the rendered frame can be obsolete by the time it is displayed. This lag between input, rendering, and display may be especially pronounced in artificial reality applications where the physical hands of the user are visible (whether in a passthrough or animated form). The systems and techniques described herein present a comprehensive solution that can convincingly display objects associated with a user's hand, such as a pen or cup held in a user's hands, or facilitate advanced interactions with a user's hand, such as virtual putty that deforms based on tracked hand positions.

In particular embodiments, the disclosure relates to a system that provides a specialized application programming interface (API) to applications running on the framework provided by the artificial reality system. As illustrated in FIG. 1A, the artificial reality system comprises a stage computing system and mobile computing system, such as a headset system, that also provides for display of virtual objects to a user. Through the API, an application can specify that a virtual object is to be anchored to a specific point on a user's hand, such as, e.g., the first joint on user's left ring finger, or other predetermined relationship to a specified physical object. Through the API, the application may also be able to interact with callback functions to further customize the interactions between the virtual object and the user's hand. While rendering a frame on the stage computing system, the artificial reality system receives hand tracking information and head tracking information, associates the virtual object with the specified anchor point based on the hand tracking information, and renders an image of the virtual object as viewed from a perspective defined by the head tracking information. In particular embodiments, the image of the virtual object may be referred to as a surface object primitive or surface of the virtual environment.

The rendered image may be sent to the headset, which is capable of displaying sub-frames at a higher rate than the rate at which the image of the virtual object is rendered (e.g., 100 fps compared to 30 fps). At each sub-frame until the next frame comprising a new image of the virtual object is rendered, the image of the hand-locked virtual object may be warped based on updates to the viewpoint of the user (e.g., based on head rotation and translation) and updates from a hand tracking subsystem (e.g., hand and finger rotation and translation).

The warping and translation can be computed in a variety of manners depending, for example, on the power and hardware resources available, the complexity of the virtual object and virtual environment, etc. As an example, in particular embodiments, for each sub-frame, the headset may first compute a three-dimensional transform for the image of the virtual object in the virtual environment based on differences between the current hand pose and the hand pose used for rendering the image. The headset may then transform the image of the virtual object in the virtual environment based on the three-dimensional transform. The headset may then project the transformed surface to the current viewpoint of the user (e.g., based on head pose tracking information). This embodiment may specifically account for other virtual objects, including other surfaces that may occlude or be occluded by the image of the hand-locked virtual object. In particular, the third step may allow for straightforward accounting of relative visibility of surfaces and virtual objects.

As another example, in particular embodiments, a two-dimensional transform for the image of the virtual object (e.g., relative to the viewpoint of the user) may be computed to encapsulate the process described over. For each sub-frame, the headset may first compute a two-dimensional transform for the image of the virtual object based on differences between the current head pose and hand pose and the head pose and hand pose used for rendering the image of the virtual object. The headset may then transform the image of the virtual object using the two-dimensional transform function. In both example approaches, the appearance of the hand-locked virtual object shown in the image (e.g., color, text, etc.) of the hand-locked virtual object may not be updated until another frame is rendered. Instead, the image of the virtual object is manipulated as a virtual object in the virtual environment. At the appropriate time for another frame to be rendered, the pose and appearance of the virtual object may be updated based on a newly-reported pose of the hand and a newly-reported pose of the head.

In particular embodiments, the hand-locked virtual object is first rendered by a stage and warping operations are performed by the headset. In other embodiments, the headset may be capable of both rendering and warping of hand-locked objects. In such an embodiment, world-locked objects may continue to be rendered by the stage at a first frame rate (e.g., 30 fps) and warped by the headset. Hand-locked virtual objects may be directly rendered at a display rate (e.g., 100 fps) and warped by the headset. In this case, the image of the hand-locked virtual object is rendered at display rate, so it may be transformed to accommodate changes in the user's hand pose. However, it may still be provided to a warping engine of the headset so that the image of the hand-locked object could be corrected for, e.g., lens distortion, display non-uniformities, chromatic aberrations, etc.

In particular embodiments, the artificial reality system supporting hand-locked virtual object rendering may also facilitate occlusion of virtual objects by the user's hands. This may be used, for example, to show only the portions of the object that would be visible if it were really held by the user (e.g., showing only portions of a hand tool that are not blocked by a user's fingers, or showing only the front face of a ring). A hand-occlusion subsystem may receive hand tracking data from the hand tracking subsystem. The hand-occlusion subsystem may update, at the display rate (e.g., 100 fps), a three-dimensional hand model that represents the user's current hand pose in the virtual environment. Using the hand model and the user's current viewpoint, the hand occlusion subsystem may generate a mask for the occluding portions of a user's hand with viewspace depth. During preparation of each sub-frame for display, the display system may check against the hand mask and compare the depths of surfaces and virtual objects near the user's hands against the depth associated with the hand mask. If the hand mask is closer to the user's viewpoint, the portions of the object blocked by the hand mask are not displayed during the sub-frame. This may involve providing instructions to the display component so that the pixels corresponding to the hand mask are turned off so that the virtual object is not displayed and the physical world (including the user's hand) becomes visible. Presenting the user with a view of their own physical hands in front of, or interacting with, virtual objects, may assist a user with being comfortable with the augmented reality environment. For example, embodiments of this disclosure may help reduce motion sickness or simulation sickness for the user.

Present AR technology is incapable of efficiently solving these problems. In one common approach to presenting an AR experience, the user views the environment through a standard screen (e.g., a smartphone screen). The virtual environment is superposed on an image of the environment capture by a camera. This requires significant computational resources, as the image of the environment must be captured and processed rapidly and will quickly drain the battery of mobile devices. Additionally, this type of experience is not particularly immersive for the user, as they are limited to viewing the environment through a small screen. In a related approach, it is difficult for many current systems to accurately detect a user's hands using available camera techniques to such a degree that the user's hands can be user to manipulate virtual objects in the virtual environment. There is a lack of advanced techniques, such as those disclosed here, to accurately model the user's hands in the virtual environment and the effects caused by the user's hands in that environment, and to render the virtual environment based on the effects. As one additional example, current rendering approaches for artificial reality systems are incapable of rendering most virtual environments at a sufficiently high frame rate and degree of quality that the user will be comfortable experiencing the virtual environment for any substantial length of time. As described herein, a high frame rate may be particularly advantageous for mixed or augmented reality experiences because the juxtaposition between the virtual objects and the user's real environment will allow the user to quickly discern any technical failings in the rendering. The approaches described herein address all of the technical issues and more.

In particular embodiments, to support occlusion of virtual objects by a user's hands, the computing device may determine a distance from the user's hand to the viewpoint of the user into the real environment. The computing device may correlate that distance with a distance from a virtual object representation of the hand to the viewpoint of the user into the virtual environment. The computing device may also create a grid for storing height information for different regions of the hand, for example, corresponding to the height of that region above or below a reference plane, or a grid for storing depth information for different regions of the hand, for example, corresponding to the distance between that region of the hand and the viewpoint of the user. From the image(s) and three-dimensional mesh, the computing device determines the heights of the points of the hand (e.g., the height of a particular point of the hand relative to a mean or median height or reference point on the hand). The determined heights indicate the positions of the points on the hand relative to rest of the hand. Combined with the determined distance, the height can be used to determine an exact position of various portions of the hand relative to the user. Alternatively, as described herein, the user's hand can be stored as a three-dimensional geometric model and the relevant distances can be determined from the three-dimensional representation.

While rendering the virtual environment and presenting the virtual environment to the user, the portions of the hand that are closer to the user than any virtual object should be visible to the user, while portions of the hand that are behind at least one virtual object should be occluded. The user's actual physical hand can be made visible to the user through the HMD of the AR system. In particular embodiments, light emitting components (e.g., LEDs) in the HMD that display the virtual objects in the virtual environment can be selectively disabled to allow light from the real environment to pass through the HMD to the user's eyes. That is, the computing device creates cut-out areas in the rendered image where the hand is to appear. Thus, for example, the user's actual physical thumb can be made visible to the user through the HMD by instructing light emitters not to illuminate positions of the display that correspond to the thumb's position. Since the light emitters are turned off, the portions of any virtual objects behind it are not displayed.

To properly render real-world object occlusions, the light emitters that correspond to a portion of the object (e.g., portion of the user's hand) should be turned off, or instructed not to illuminate, when that portion of the hand is closer to the user in the real environment than any virtual objects in the virtual environment and turned on when there is a virtual object between the user and that portion of the hand. Portions of the object (e.g., a finger on a hand) that are farther from the user in the real environment than a virtual object is from the user in the virtual environment are shown as being behind the virtual objects by the light emitters displaying the virtual object. Comparing the distances to real-world object and to virtual objects is possible because, for example, the distances are determined from hand-tracking information. The virtual object distances are known by the application or scene executing on the AR system and available to the AR system and HMD.

Given the virtual object representation of the user's hand and the known heights of the positions of the hand (or alternatively, the depth of the portion of the hand from the viewpoint of the user), the portions of the hand that should be visible to the user can be made visible by the HMD as follows. A frame showing the virtual environment may be rendered based on the user's current pose (e.g., position and orientation) by a primary rendering component, such as a stage computing device, at a first frame rate, such as 30 fps. As part of rendering the frame, two items are generated: (1) a two-dimensional opaque texture for the hand based on the three-dimensional mesh, and (2) the height map for the hand (or depth map, if applicable). The two-dimensional texture is saved as the texture of the image of the virtual object. These operations may be performed by the HMD, or by a separate computing device in communication with the HMD hardware. Light emitters can be instructed not to illuminate by using a specially designated color for the texture. In AR, it may be desirable to have a default background that allows for light from the real environment to passthrough. In that way, the immersion of the virtual objects appearing the real environment can be greatly enhanced. Thus, the background may be associated with a color that is translated to instructions to the light emitters not to illuminate.

The HMD may then render subframes at a second rate, such as 100 fps based on the previously generated frames (e.g., based on the frame that was generated at 30 fps including the image of the virtual object). For each subframe, the AR system may perform a primary visibility test by casting one or more rays from the user's current viewpoint into the virtual environment based on the user's pose (which could be different than the pose used for generating the main 30 fps frame) for each individual pixel or tile of pixels into the virtual environment. In particular embodiments, the virtual environment may have a limited number of virtual objects. For example, the AR system may limit the number of discrete objects in the virtual environment (including the object created to represent the user's hand). The virtual objects may be represented by a surface with corresponding height map information (or depth map information if depth is being used). If the projected ray intersects a surface that corresponds to a user's hand, then it samples the associated texture to render the subframe. Since the texture is opaque black, which indicates that the light emitters are not to be illuminated, the actual physical hand is visible through the unilluminated area of the HMD, which is transparent. More information on hand occlusion through modeling a user's hand and depth-testing the model and other virtual objects may be found in U.S. patent application Ser. No. 16/805,484, filed Feb. 28, 2020, which is incorporated by reference.

In particular embodiments the primary rendering device, e.g., other computing device besides the HMD may be equipped with more processing capacity and electrical power supply than the HMD. The primary rendering device may therefore perform certain portions of the techniques described herein. For example, the primary rendering device may perform the hand tracking computations, generate the three-dimensional mesh, the two-dimensional opaque texture, and the height map (or depth map, if applicable) for the hand. For example, the primary rendering device may receive the images created by the cameras of the HMD and perform the necessary processing using specialized computing hardware designed to be more efficient or powerful on the particular tasks. However, if the HMD has sufficient processing and electrical power, the HMD can perform one or more of those steps (e.g., using its own on-board computing components) to reduce latency. In particular embodiments, all of the steps described herein are performed on the HMD.

FIG. 1A illustrates an example artificial reality system 100. In particular embodiments, the artificial reality system 100 may include a headset system 110 (which may be embodied in a HMD), a stage computing system 120 (which may include a body wearable computing system, laptop computing system, desktop computing system, etc.), a cloud computing system 132 in a cloud computing environment 130, etc. In particular embodiments, the headset system 110 may include a variety of subsystems performing functions as described herein. The various subsystems may include specialized hardware and integrated circuits to facilitate their function. In particular embodiments, the subsystems may be functional subsystems operating on one or more processors or integrated circuits of the headset system 110. Thus, where this application describes various systems of the headset system 110, it should be understood that these are not limited to separate hardware components of the headset system 110.

In particular embodiments, the headset system 110 may including a tracking system 140 that tracks information about the physical environment of the wearer. For example, the tracking system 140 may include a hand tracking subsystem that tracks the hands of the wearer of the headset. The hand tracking subsystem may employ optical sensors, light projection sensors, or other types of sensors to perform the hand tracking. The hand tracking subsystem may further utilize hand tracking algorithms and models to generate the hand tracking information. The hand tracking information may include the pose (e.g., position and orientation) of the hands and various anchor points or components of the hands. In particular embodiments, the tracking system 140 may include a head tracking subsystem that tracks the pose (e.g., position and orientation) of the head of the wearer. The head tracking subsystem may use sensors mounted to or included in the headset system 110, such as optical sensors, to determine the pose, or may calculate the pose from external sensors throughout the physical environment of the headset system 110. In particular embodiments, the headset system 110 may further include an occlusion system 145 that determines, from information provided by the tracking system 140 whether one or virtual objects in the virtual environment of an artificial reality experience presented by the headset system 110 should be occluded by the user or physical objects manipulated by the user.

In particular embodiments, the headset system 110 may further include a display engine 112 which is connected to two eye display systems 116A and 116B through a data bus 114. The headset system 110 may be a system including a head-mounted display (HMD) which may be mounted on a user's head to provide artificial or augmented reality to the user. The headset system 110 may be designed to be lightweight and highly portable. As a result, the headset system may have limited power available in its power sources (e.g., batteries). The display engine 112 may provide display data to the eye display systems 116A and 116B though the data bus 114 with relative high data rates (e.g., suitable to support refresh rates of 200 Hz or higher). The display engine 112 may include one or more controller blocks, texel memories, transform blocks, pixel blocks, etc. The texels stored in the texel memories may be accessed by pixel blocks and may be provided to the eye display systems 116A and 116B for display. More information on the described display engine 112 may be found in U.S. patent application Ser. No. 16/657,820, filed Oct. 1, 2019, U.S. patent application Ser. No. 16/586,590, filed Sep. 27, 2019, and U.S. patent application Ser. No. 16/586,598, filed Sep. 27, 2019, which are incorporated by reference.

In particular embodiments, the stage computing system 120 may be worn on the body of a user. In particular embodiments, the stage computing system 120 may be a computing system (e.g., a laptop, a desktop, a mobile computing system) that is not worn on a user body. The stage computing system 120 may include one or more GPUs, one or more smart video decoders, memories, processors, and other modules. The stage computing system 120 may have more computational resources than the display engine 112 but, in some embodiments, may still have limited power in its power sources (e.g., batteries). Although not illustrated, in particular embodiments, the stage computing system may have subsystems for supporting tracking the wearer of the headset system 110 and physical objects in the environment of the headset system 110, or for supporting occlusion calculations. The stage computing system 120 may be coupled with the headset system 110 through a wireless connection 144. The cloud computing system 132 may include high performance computers (e.g., servers) and may communicate with the stage computing system 120 through a wired or wireless connection 142. In some embodiments, the cloud computing system 132 may further communicate with the headset system 110 through a wireless connection (not shown). The stage computing system 120 may generate data for rendering at a standard data rate (e.g., suitable to support refresh rates of 30 Hz or higher). The display engine 112 may up-sample the data received from the stage computing system 120 to generate frames to be displayed by the eye display systems 116A and 116B at a higher frame rate (e.g., 200 Hz or higher).

Figure 1B:
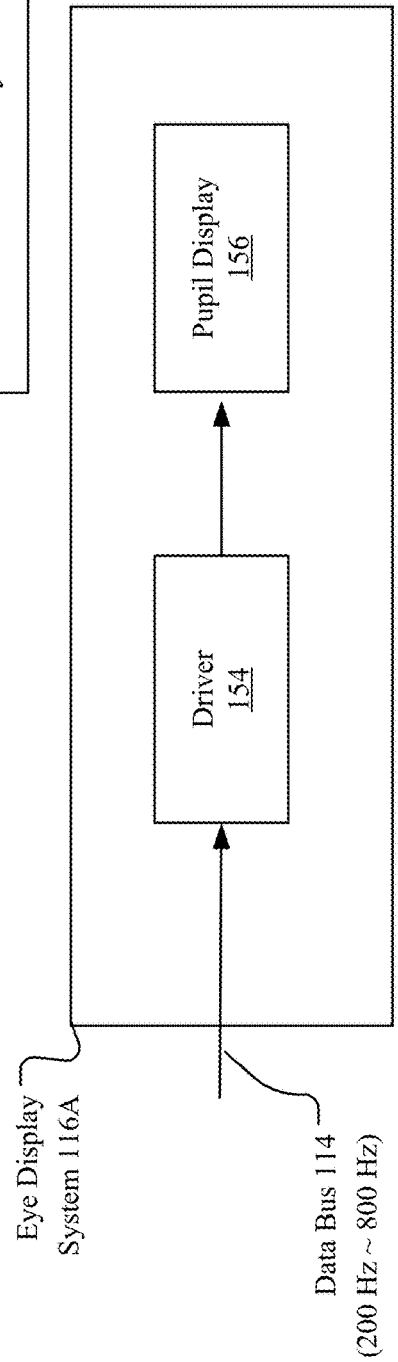
FIG. 1B illustrates an example eye display system of a headset system.

FIG. 1B illustrates an example eye display system (e.g., 116A or 116B) of the headset system 110. In particular embodiments, the eye display system 116A may include a driver 154, a pupil display 156, etc. The display engine 112 may provide display data to the pupil display 156, the data bus 114, and the driver 154 at high data rates (e.g., suitable to support refresh rates of 200 Hz or higher).

Figure 2:
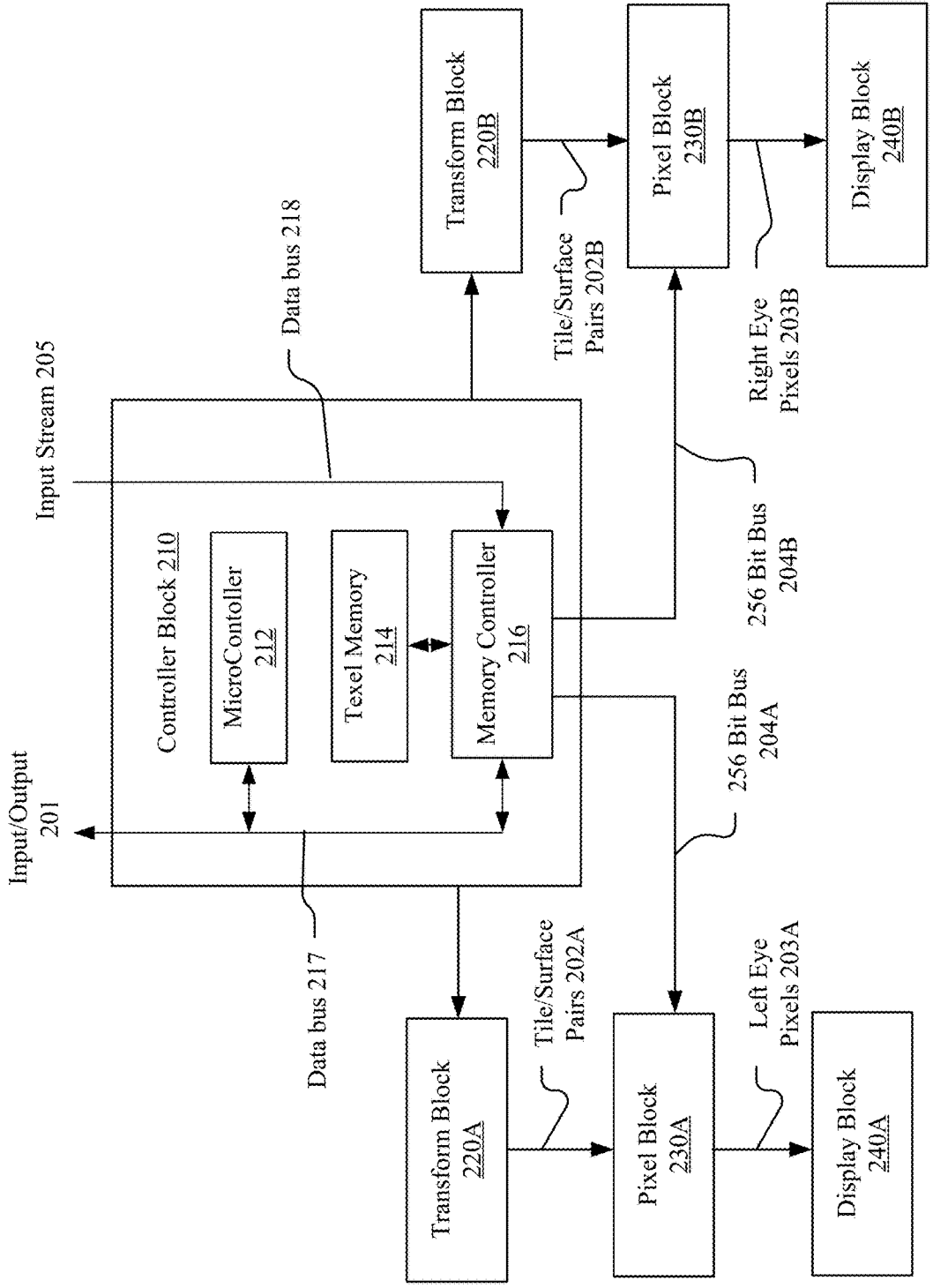
FIG. 2 illustrates a system diagram for a display engine.

FIG. 2 illustrates a system diagram for a display engine 112. In particular embodiments, the display engine 112 may include a control block 210, transform blocks 220A and 220B, pixel blocks 230A and 230B, display blocks 240A and 240B, etc. One or more of the components of the display engine 112 may be configured to communicate via a high-speed bus, shared memory, or any other suitable method. As shown in FIG. 2, the control block 210 of display engine 112 may be configured to communicate with the transform blocks 220A and 220B, pixel blocks 230A and 230B, and display blocks 240A and 240B. As explained in further detail herein, this communication may include data as well as control signals, interrupts, and other instructions.

In particular embodiments, the control block 210 may receive input from the stage computing system (e.g., 120 in FIG. 1A) and initialize a pipeline in the display engine 112 to finalize the rendering for display. In particular embodiments, the control block 210 may receive data and control packets from the stage computing system at a first data rate or frame rate. The data and control packets may include information such as one or more data structures comprising texture data and position data and additional rendering instructions. In particular embodiments the data structures may comprise two-dimensional rendering information. The data structures may be referred to herein as "surfaces" and may represent images of the virtual objects to be presented in the virtual environment. The control block 210 may distribute data as needed to one or more other blocks of the display engine 112. The control block 210 may initiate pipeline processing for one or more frames to be displayed. In particular embodiments, each of the eye display systems 116A and 116B may comprise its own control block 210. In particular embodiments, one or more of the eye display systems 116A and 116B may share a control block 210.

In particular embodiments, the transform blocks 220A and 220B may determine initial visibility information for surfaces to be displayed in the artificial reality scene. In general, the transform blocks 220A and 220B may cast rays with origins based on pixel locations in an image to be displayed and produce filter commands (e.g., filtering based on bilinear or other types of interpolation techniques) to send to the pixel blocks 230A and 230B. The transform blocks 220A and 220B may perform ray casting based on the current viewpoint of the user into the user's real or virtual environment. The user's viewpoint may be determined using the headset's sensors, such as one or more cameras (e.g., monochrome, full-color, depth-sensing), inertial measurement units, eye trackers, and/or any suitable tracking/localization algorithms, such as simultaneous localization and mapping (SLAM)) into the environment and/or virtual scene where surfaces are positioned and may produce results to send to the pixel blocks 230A and 230B.

In general, the transform blocks 220A and 220B may each comprise a four-stage pipeline, in accordance with particular embodiments. The stages of a transform block 220A or 220B may proceed as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems 116A and 116B of the headset system 110. In particular embodiments, the transform blocks 220A and 220B may determine whether each ray bundle intersects with surfaces in the scene by comparing a bounding box of each tile to bounding boxes for the surfaces. If a ray bundle does not intersect with an object, it may be discarded. Tile-surface intersections are detected, and the corresponding tile-surface pair is passed to the pixel blocks 230A and 230B.

In general, the pixel blocks 230A and 230B may determine color values from the tile-surface pairs to produce pixel color values, in accordance with particular embodiments. The color values for each pixel may be sampled from the texture data of surfaces received and stored by the control block 210. The pixel blocks 230A and 230B may receive tile-surface pairs from the transform blocks 220A and 220B and may schedule bilinear filtering. For each tile-surface pair, the pixel blocks 230A and 230B may sample color information for the pixels corresponding to the tile using color values corresponding to where the projected tile intersects the surface. In particular embodiments, the pixel blocks 230A and 230B may process the red, green, and blue color components separately for each pixel. In particular embodiments, as described herein, the pixel block may employ one or more processing shortcuts based on the color (e.g., color and opacity) associated with the surface. In particular embodiments, the pixel block 230A of the display engine 112 of the first eye display system 116A may proceed independently, and in parallel with, the pixel block 230B of the display engine 112 of the second eye display system 116B. The pixel block may then output its color determinations to the display block.

In general, the display blocks 240A and 240B may receive pixel color values from the pixel blocks 230A and 230B, convert the format of the data to be more suitable for the display (e.g., if the display requires a specific data format as in a scanline display), apply one or more brightness corrections to the pixel color values, and prepare the pixel color values for output to the display. The display blocks 240A and 240B may convert tile-order pixel color values generated by the pixel blocks 230A and 230B into scanline or row-order data, which may be required by the physical displays. The brightness corrections may include any requisite brightness correction, gamma mapping, and dithering. The display blocks 240A and 240B may output the corrected pixel color values directly to the physical display (e.g., pupil display 156 in FIG. 1B via the driver 154) or may output the pixel values to a block external to the display engine 112 in a variety of formats. For example, the eye display systems 116A and 116B or headset system 110 may comprise additional hardware or software to further customize backend color processing, to support a wider interface to the display, or to optimize display speed or fidelity.

In particular embodiments, the controller block 210 may include a microcontroller 212, a texel memory 214, a memory controller 216, a data bus 217 for I/O communication, a data bus 218 for input stream data 205, etc. The memory controller 216 and the microcontroller 212 may be coupled through the data bus 217 for I/O communication with other modules of the system. The microcontroller 212 may receive control packages such as position data and surface information though the data bus 217. The input stream data 205 may be input to controller blocks 210 from the stage computing system after being set up by the microcontroller 222. The input stream data 205 may be converted to the required texel format and stored into the texel memory 214 by the memory controller 216. In particular embodiments, the texel memory 214 may be static random-access memory (SRAM).

In particular embodiments, the stage computing system 120 and other subsystems of the headset system 110 may send input stream data 205 to the memory controller 216, which may convert the input stream data into texels with required formats and store the texels with swizzle patterns in the texel memory 214. The texel memory organized in these swizzle patterns may allow the texels (e.g., in 4×4 texel blocks) that are needed for determining at least one color component (e.g., red, green, and/or blue) of every pixel all pixels associated with a tile (e.g., "tile" refers to an aligned block of pixels, such as a block of 16×16 pixels) to be retrieved by the pixel bocks 230A and 230B using one reading operation. As a result, the display engine 112 may avoid excess multiplexing operations typically required for reading and assembling texel arrays if the texel array is not stored in appropriate patterns and may therefore reduce computational resource requirement and power consumption of the display engine 112 and the headset system overall.

In particular embodiments, the pixel blocks 230A and 230B may generate pixel data for display based on retrieved texels from the texel memory 212. The memory controller 216 may be coupled to pixel blocks 230A and 230B through two 256 bits data buses 204A and 204B, respectively. The pixel bocks 230A and 230B may receive the tile/surface pairs 202A and 202B from the respective transform blocks 220A and 220B and may identify the texels that are needed to determine at least one color component of all the pixels associated with the tile. The pixel blocks 230A and 230B may in-parallel retrieve the identified texels (e.g., a 4×4 texel array) from the texel memory 214 through the memory controller 216 and the 256 bits data buses 204A and 204B. For example, the 4×4 texel array that are needed to determine at least one color component of all the pixels associated with a tile may be stored in one memory block and may be retrieved using one memory reading operation. The pixel blocks 230A and 230B may use multiple sample filter blocks (e.g., one for each color component) to in-parallel perform interpolation on different groups of texels to determine the corresponding color component for the corresponding pixels. The pixels values 203A and 203B for each eye may be sent to the display blocks 240A and 240B for further processing before being displayed by the eye display systems 116A and 116B, respectively.

In particular embodiments, the artificial reality system 100, and particularly the headset system 110, may be used to render an augmented reality environment to a user. An augmented reality environment may comprise elements of a virtual reality environment (e.g., virtual reality objects) rendered for a user so that the virtual elements appear on top of, or a part of, the real environment of the user. For example, a user may be wearing an HMD (e.g., headset system 110) embodying features of the techniques disclosed herein. The HMD may encompass a display that permits light from the environment of the user to ordinarily continue on to the eyes of the user. When, however, a light emitting component (e.g., LED, OLED, microLED, etc.) of the display is illuminated at a particular position in the display, the color of the LED may be superposed on top of the environment of the user. Thus, virtual objects may appear in front of the real environment of the user when a light emitter of the display is illuminated, while the environment of the user may be visible at a particular position through the display when the light emitting component at that position is unilluminated. This may be accomplished without the use of cameras to re-render the environment. This procedure may increase the immersion of the user and the user's comfort using the artificial reality system 100 while simultaneously decreasing computing power needed and battery consumption caused by rendering the virtual environment.

In particular embodiments, the selectively illuminated display may be used to facilitate a user's interactions with virtual objects in the virtual environment. For example, the positions of a user's hands may be tracked. In previous systems, the only way for a user's hands to be represented in the virtual environment, even in hand-tracking systems, is to generate and render some virtual representation of the hands. In many use scenarios this may be inappropriate. For example, it may be desirable in a workplace environment for the user's hands themselves to be visible to the user as they interact with an object. For example, it may be desirable for an artist to see their own hands as they are holding a virtual paintbrush or other tool. Disclosed herein are techniques for enabling such advanced display.

Figure 3:
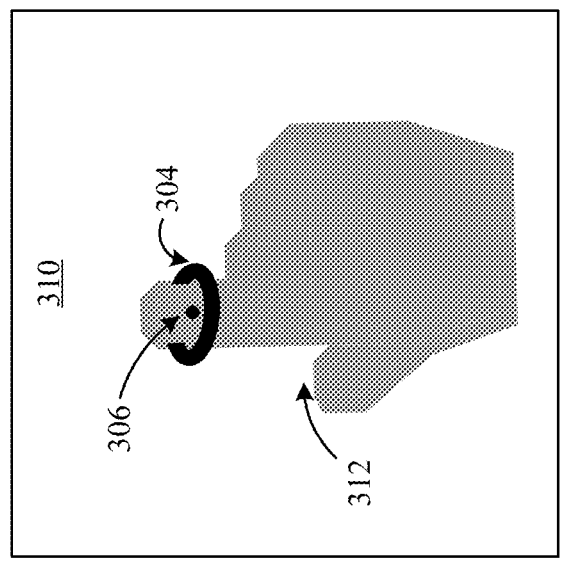
FIG. 3 illustrates an example image viewed through an artificial reality system.
Figure 3:
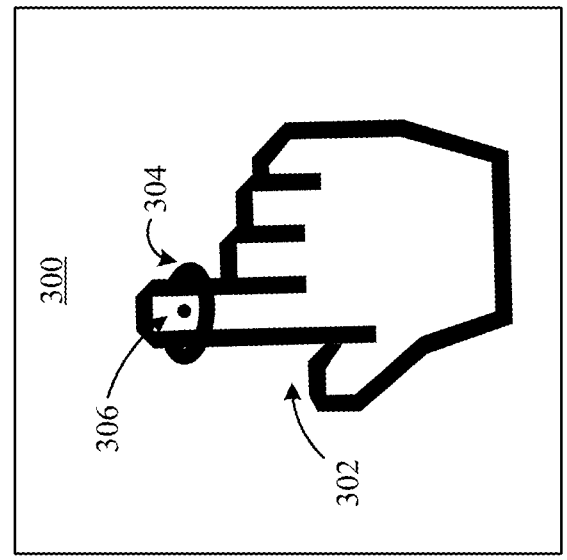

Principles of the techniques described herein will now be explained. FIG. 3 illustrates an example of an in-headset view of a user illustrating the example of a user viewing their own hand in through an artificial reality display system. FIG. 3 further illustrates how discrepancies between the pose of virtual objects displayed to the user and the user's current hand pose can reduce the user's experience of interacting with an artificial reality system 100. The in-headset view 300 shows a composite (e.g., mixed) reality display that includes a view of a virtual object 304 and the view of the user's physical hand 302. The position of the virtual object 304 is anchored to a predetermined position 306 on the user's physical hand 302. In this example, the virtual object 304 is a ring that is configured to be anchored to the first joint on the user's hand. The anchoring position 306 can be configured, for example by the user or by a developer of the artificial reality experience, to be adjustable so that the user can move the anchoring point 306 or relationship to the user's hand 302. Note that, because the virtual object 304 is designed to appear to wrap around the user's hand 302 when viewed by the user, a portion of the virtual object 304 is occluded by the user's hand 302 and should not be displayed.

To determine the occluded portion of the virtual object 304, in particular embodiments, the artificial reality system 100 may access or generate a virtual representation of the user's hand. View 310 shows the virtual representation of the user's hand 312 based on the view 300. Using the virtual representation of the hand 312, the artificial reality system 100 can determine which portions of the virtual object 304 should be occluded. For example, in certain embodiments, the artificial reality system 100 may perform a raycasting or raytracing operation from the viewpoint of the user. The artificial reality system 100 may insert the virtual object 304 and virtual representation of the user's hand 312 into the virtual environment according to the positioning specified by the anchor position 306 and specified relationship (e.g., with the ring the appropriate finger and the appropriate point). The artificial reality system 100 may then cast rays into the virtual environment from the viewpoint of the user and determine whether the first viewable virtual object is the virtual object 304 or the virtual representation of the user's hand 312. Based on the results, the artificial reality system 100 may prepare a rendered image of the virtual object 304, choosing not to render the portions obscured by the user's hand. In certain embodiments, the raycasting or raytracing operation may be augmented by the use of depth maps (or height maps) associated with the virtual object 304 and the virtual representation of the user's hand 312.

Figure 4:
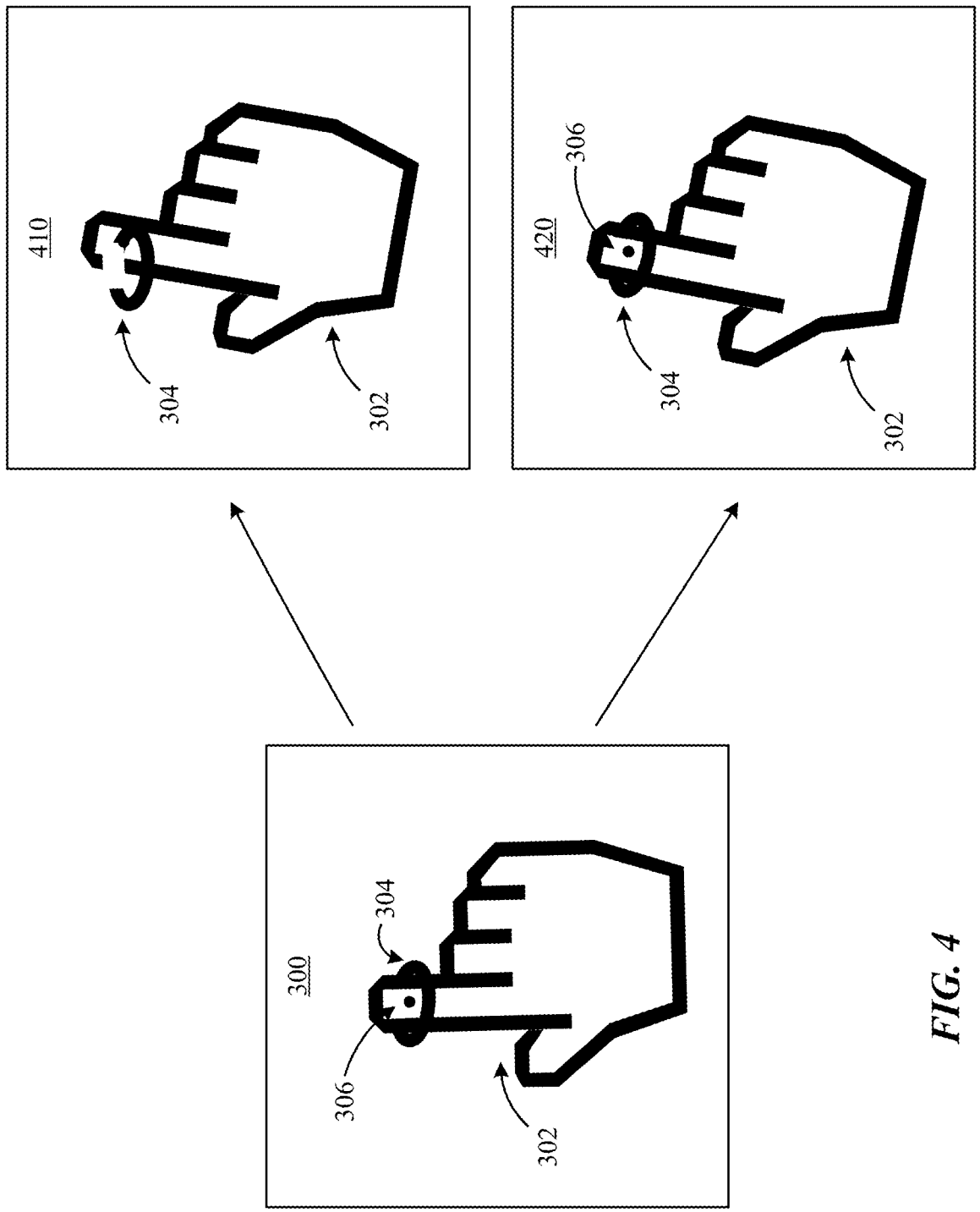
FIG. 4 illustrates an example image viewed through an artificial reality system.

As will be described herein, there may be scenarios where the hand pose of the user changes faster than the rate at which images of the user's hand can be updated and presented to the user using traditional techniques. Consider an example of the potential discrepancy illustrated through FIG. 4. FIG. 4 shows the view 300 including the user's hand 302 and the ring virtual object 304 from FIG. 3. Views 410 and 420 show alternate presentations to the user after some period of time in which the user's hand 302 has moved. In this example, artificial reality system 100 is showing a mixed reality view, meaning the user can perceive their own hand 302. Any differences between where virtual objects are shown and where they are believed to belong may be particularly impactful in hand-locked rendering, as it may be immediately intuitive to a user how a hand-locked virtual object should appear. In the view 410, the user's hand pose 302 has shifted to rotate slightly. However, the pose and appearance of the virtual object 304 has not changed. Thus, it will be immediately apparent to the user that the virtual object 304 is not properly rendered, breaking the immersive qualities of the hand-locked rendering of the virtual object 304. The situation in view 410 can occur where the virtual object 304 is not re-rendered at a sufficiently high rate.

As one solution to this problem, and as disclosed herein, rather than merely attempt to increase the rate at which images of the virtual object are generated from virtual models and presented to the user, the artificial reality system 100 may provide for sub-frame updating of rendered frames. Sub-frame rendering may involve adjusting or otherwise modifying the rendered image (e.g., a "first image") of the virtual object (e.g., placing the first image in the virtual environment or directly modifying the image) before rendering and providing the adjusted image (e.g., a "second image") to the user. View 420 shows a view of the user's hand 302 and virtual object 304 after the user's hand pose has changed and the virtual object 304 has been updated to reflect a detection of the change. The virtual object 304 has been rotated and otherwise moved to stay anchored to the anchor point 306 on the user's hand 302 when viewed through the artificial reality system 100.

Figure 5A:
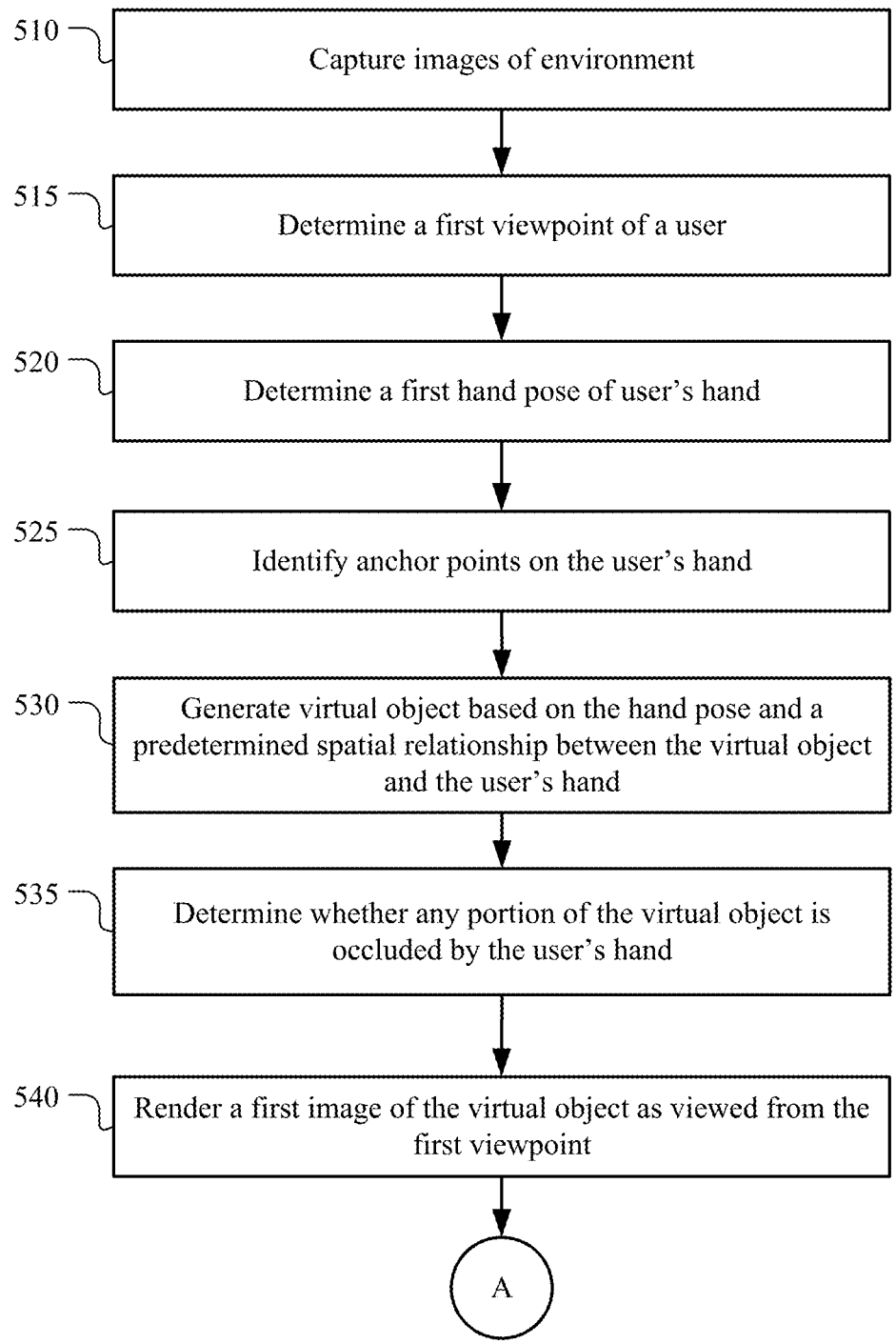
FIGS. 5A-5B illustrates an example method for providing for hand-locked rendering of virtual objects in artificial reality with sub-frame rendering.
Figure 5B:
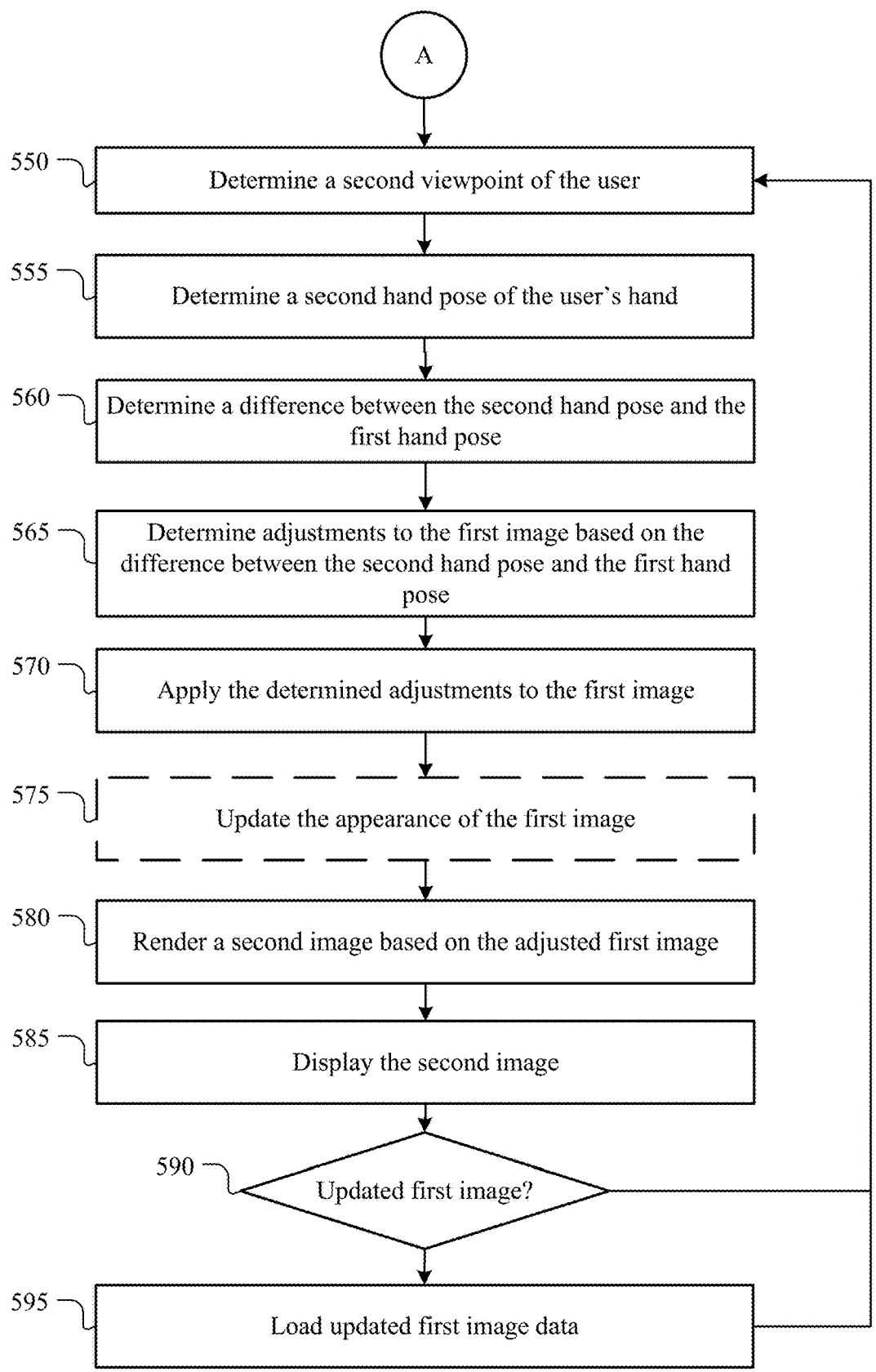

FIGS. 5A-5B illustrates an example method 500 for providing for hand-locked rendering of virtual objects in artificial reality with sub-frame rendering. In particular embodiments, steps 810-840 may be related to generating a first image to be displayed to a wearer of the headset system 110 110 based on the position of a user's hand and virtual objects in a virtual environment. In particular embodiments, one or more of steps 810-840 may be performed by a stage computing system 120, by another suitable computing system with greater computing resources than the headset system 110 and communicatively coupled to headset system 110, or by the headset system 110 itself. In particular embodiments, the work performed in each step may be allocated among the eligible computing systems by a work controller of the artificial reality system 100, for example, based on one or more metrics of available computing resources, such as battery power, processor (e.g., GPU, CPU, other ASICs) utilization, memory availability, heat levels, etc.

The method may begin at step 510, where at least one camera of a headset system 110 (e.g., a head-mounted display) may capture images of an environment of the headset system 110. In particular embodiments, the images may be standard full-color images, monochrome images, depth-sensing images, or any other suitable type of image. The images may include objects which the artificial reality system 100 determines should be used to occlude virtual objects in a virtual or mixed reality view. Furthermore, the images may include the user's hand, but may also include a wide variety of suitable objects as described above.

The method may continue at step 515 where a computing system may determine a viewpoint of a user of the headset system 110 into the environment. In particular embodiments, the viewpoint may be determined purely from the captured images of the environment using a suitable localizing and/or mapping technique. In particular embodiments, the viewpoint may be determined using data retrieved from other sensors of the headset system 110, such as head pose tracking sensors integrated into the headset system 110 that provide head tracking information (e.g., from the tracking system 140). From this head tracking information, the artificial reality system 100 may determine the viewpoint of the user and transpose the viewpoint of the user into the virtual environment containing the virtual object. As an example, the artificial reality system 100 may treat the viewpoint of the user as a camera viewing into the virtual environment.

At step 520 the artificial reality system 100 may determine a hand pose (e.g., position and orientation) of one or more of the user's hands based on hand tracking information. The artificial reality system 100 may be in communication with or comprise hand tracking components (e.g., from the tracking system 140) that detect the pose of the user's hand. In particular embodiments, the hand tracking components may comprise sensors attached to objects held by the user in order to interact with the virtual environment. In particular embodiments, the hand tracking components may comprise hand tracking models which receive as input the captured images, including the portions of the captured images that include the user's hand and generate the hand pose using hand tracking algorithms and machine-learning models.

The computing system may perform one of several algorithms to identify the existence of the user's hand in the captured images. After confirming that the hand actually appears in the image, the computing system may perform a hand tracking analysis to identify the existence and location of several discrete locations on the user's hand in the capture image. In particular embodiments, the hand tracking may be facilitated using depth-tracking cameras. In particular embodiments, the hand tracking may be performed without standard depth tracking using deep learning and model-based tracking. Deep neural networks may be trained and used to predict the location of a person's hand as well as landmarks, such as joints of the hands and fingertips. The landmarks may be used to reconstruct a high degree-of-freedom pose (e.g., 26 degree of freedom pose) of the hand and fingers. Predictive models for the pose of the person's hand can be used to reduce latency between pose detection and rendering or display. Additionally, detected hand poses detected, e.g., using hand tracking systems or detected using predictive models—can be stored for further use by the hand tracking analysis. As an example, the detected hand poses can be used as a base pose and extrapolated from to generate potential predictive poses in ensuing frames or at later times. This therefore can improve the speed of hand pose prediction and detection. The pose may provide a location of the hand relative to the viewpoint of the user in the environment. In some embodiments, the hand tracking components may comprise many hand tracking systems and techniques to improve adaptability and accuracy of the hand tracking systems.

At step 525, after determining the viewpoint and hand pose, the artificial reality system 100 may identify one or more anchor points on the user's hands. In particular embodiments, the hand tracking component may provide the anchor points as part of the hand tracking information. As an example, the hand tracking information may designate discrete locations on the user's hands, such as fingertips, joints, the palm, or back of hand. In particular embodiments, the artificial reality system 100 may determine the anchor points from the hand tracking information, for example, based on an operating mode of the artificial reality system 100 or based on the type of virtual objects that the artificial reality system 100 will be generating.

At step 530, the artificial reality system 100 may generate the virtual object based on the hand pose, head pose, viewpoint, and a predetermined spatial relationship between the user's hand, which may be represented by the anchor points. To prepare the virtual object 304, the artificial reality system 100 may access a model or other representation of the virtual object 304. The model of the virtual object may include, as part of its specification, information regarding how the virtual object is to be positioned relative to a user's hands. For example, the designer of the virtual object may have specified that the virtual object is to be displayed on or within a specified distance of an anchor point or other location relative to the user's hand. The specification may also include a specified orientation for the object relative to the anchor points. In the example shown in FIG. 3A, the model of the ring virtual object 304 may specify that the virtual object is to be anchored to the point 306 at the user's first joint on their first finger on the hand and that the ring should be oriented so that the ring surrounds the user's finger (e.g., that a plane comprising the virtual object 304 intersects with the anchor point 306 and is perpendicular to direction of indication of the user's finger). Using the viewpoint and hand tracking information, the artificial reality system 100 may automatically transpose the model to the location in the virtual embodiment that corresponds to the pose specified by the model. Thus, the virtual object is automatically placed in the correct location relative to the anchor point by the artificial reality system 100, without the designer of the virtual object needing to be aware of the world or camera coordinates of the virtual object.

At step 535, the artificial reality system 100 (e.g., the occlusion system 150) may determine whether any portion of the virtual object is occluded by the user's hand. As an example, the headset system 110 may generate a virtual object representation of the hand in the virtual environment. The position and orientation of the virtual object representation of the hand may be based on the updated hand tracking data and the second viewpoint. The headset system 110 may project one or more rays into the virtual environment with an origin and a trajectory based on the second viewpoint. For example, the headset system 110 may simulate projecting a ray for each pixel of the display component of the headset system 110, or a pixel for each of several groupings of the pixels. In the case of the virtual object being occluded by the user's hand when viewed from a particular pixel, the headset system 110 may determine a point of intersection of the ray with the virtual object representation of the hand before the ray intersects with another virtual object.

At step 540, with the model of the virtual object in the appropriate location and orientation in the virtual environment, the artificial reality system 100 may render a first image of the virtual object as viewed from the first viewpoint. As described herein, the first image may comprise a two-dimensional representation of the virtual object as viewed from the viewpoint. The two-dimensional representation may be assigned a location in the virtual environment (e.g., based on the viewpoint) and may optionally be assigned a depth (e.g., to facilitate object occlusion, as described herein). The first image may also be referred to herein as a surface, generated by components of the artificial reality system 100, to improve the computational efficiency of updating the pose of the virtual object at subsequent, higher, frame rates.

This first image may be rendered by the stage computing system of the artificial reality system 100 at a first frame rate (e.g., 30 frames per second). As discussed herein, the process of generating the virtual object and rendering the first image may be computationally expensive and relatively power-intensive process. Therefore, in particular embodiments the stage computing system may be a relatively more powerful computing system than the headset system 110 which actually displays the virtual environment (including the virtual objects) to the user. The stage computing system may transmit (e.g., through wired or wireless communication) the first image to a headset system 110, configured to display the artificial reality environment to the user. However, with the introduction of communication of the first image to the user, and especially if the first image is only regenerated (e.g., with the pose of the virtual object) at the first frame rate, there may be significant latency between the generating of the virtual object and the display of the first image. Even worse, the artificial reality system 100 may not be able to adapt quickly to minute changes in the viewpoint or the hand pose that can be detected by the hand or head tracking systems. The difference between where a user's hand was when a virtual object is generated and where the user's hand is when the first image is displayed can significantly reduce the quality of the user's experience with the artificial reality system 100. In addition to lowering the quality, at certain levels it can lead to physical discomfort or cause the virtual experience to malfunction.

To correct for this potential problem, the headset system 110 can be configured to update the pose of the first image and render one or more second images from the first image before the first image can be re-rendered (e.g., a subsequent first image of the virtual object can be rendered using an updated viewpoint and hand tracking information). In particular embodiments the systems for determining the viewpoint of the user and for performing head and hand tracking may be integrated into the headset system 110. Furthermore, these head and hand tracking systems can report updated hand tracking at a rate much faster than the framerate at which the first images are generated (e.g., faster than 30 Hz).

Returning to the method 500, the method may advance to step 550 shown in FIG. 5B, in which the headset system 110 determines a second viewpoint of the user into the environment and virtual environment. Steps 550-595 may be directed to generating and providing second images of the virtual object, based on adjustments made to the first image of the virtual object that are themselves based on updated hand pose and viewpoint information. The second images may be the result of the headset system 110 using the new tracking data generated since the first image was rendered, updating data where needed, and actually determining the images that will be shown to the user by display components (e.g., an array of light emitting components) of the headset system 110. The second images, also referred to as sub-frames, may be prepared and displayed at a rate that is much higher than the rate at which the first images (e.g., frames) are prepared (e.g., 200 frames per second or higher). Because of the high rate at which the second frames are prepared and displayed, it may be necessary that inter-system communication is limited. Therefore, in particular embodiments, the computations required by steps 550-595 may be performed by the headset system 110 itself and not a stage computing system 120 or other computing system communicatively coupled to the headset system 110. In particular embodiments, the headset system 110 can be configured to receive updated tracking information (e.g., steps 550-555), calculate and apply adjustments (e.g., steps 560-570), render the second image (e.g., step 580), and provide the rendered second image for display (e.g., step 585) several times for each received first image. This is because the operations of receiving the updated tracking information, calculating any differences, calculating any adjustments, and applying the adjustments, can be performed quickly as discrete tasks.

At step 550, the headset system 110 may determine second, updated viewpoint of the user into the environment and into the virtual environment around the user. The second viewpoint may be used to consider minute movements of the user (e.g., head movements, eye movements, etc.). The second viewpoint may be determined in the same manners as described above and may be received from the tracking system 140.

At step 555, the headset system 110 may determine a second hand pose of the user's hand. The headset system 110 may receive updated tracking information and determine the second hand pose from the updated tracking information as described above and may be received from the tracking system 140.

At step 560, the headset system 110 may determine a difference between the second hand pose and the first hand pose and, optionally, a difference between the second viewpoint and the first viewpoint.

At step 565, the headset system 110 may determine one or more adjustments to be performed to the first image to account for the differences between the hand pose and viewpoint. As discussed further herein, these adjustments can be determined and performed using a variety of techniques based on the fact that the first image is represented in the virtual environment as a two-dimensional object placed in the three-dimensional virtual environment.

In particular embodiments, the adjustments for rendering the second image can be computed by directly treating the first image as an object in the three-dimensional virtual embodiment. For each sub-frame to be generated, the headset system 110 may first compute a three-dimensional transform for the image of the virtual object in the virtual environment based on differences between the current hand pose and the hand pose used for rendering the first image. For example, the headset system 110 may identify a new location of the anchor point or predefined spatial relationship between the user's hands and the virtual object. The headset system 110 may calculate the difference between the location used to generate the first image and the current location. The difference may include differences along the x-axis, y-axis, or z-axis. Additionally, the headset system 110 may determine a difference between the orientation of the user's hands, such as rotations of roll, pitch, or yaw. From these differences, the headset system 110 may calculate corresponding changes to the pose of the first image as a three-dimensional transformation. For example, the headset system 110 may translate or rotate the first image in the virtual environment. The headset may then project the transformed first image to an updated viewpoint of the user (e.g., based on head pose tracking information) and render a second image for display based on the adjusted first image and viewpoint.

Figure 6:
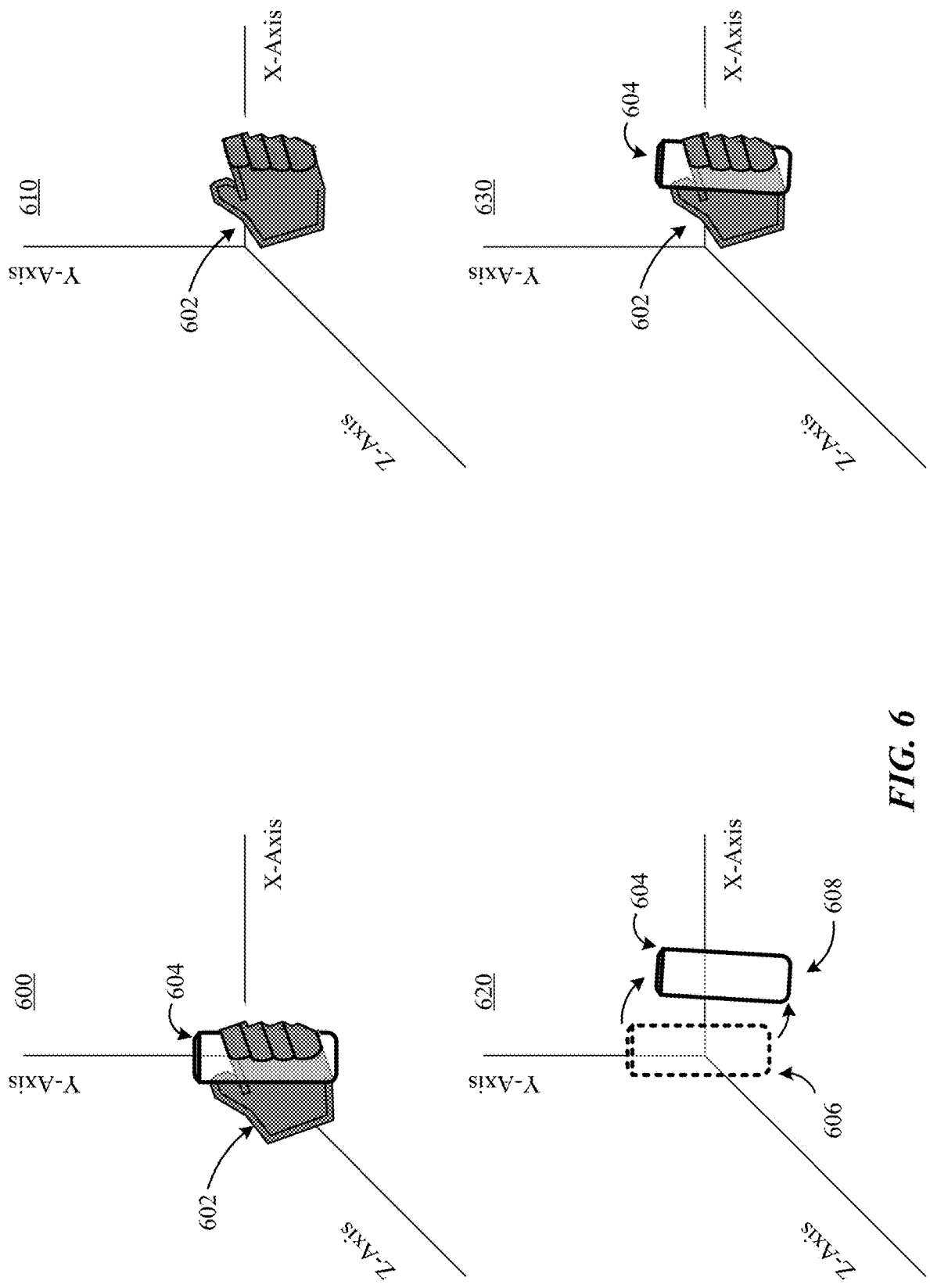
FIG. 6 illustrates an example of adjustments to a first image for rendering a second image.

FIG. 6 illustrates an example of computing adjustments for rendering the second image by moving the first image in the three-dimensional virtual embodiment. View 600 shows a conceptual view into an environment that includes a representation of a user's hand 602 and an image of a virtual object 604 that is shown as being held by the user's hand 602. View 610 shows the pose of the user's hand 602 at a later time after view 600 is shown to the user. View 610, then, shows the conceptual environment after the headset has determined updated hand pose information. View 620 shows the translation and rotation of the image of the virtual object 604 from the position 606 shown in view 610 to a position 608 based on the updated hand pose information. Finally, view 630 shows a composite view of the representation of the user's hand 602 and the image of the virtual object 604 at the position 608. For simplicity, view 630 is shown from the same viewpoint, although the viewpoint may change based on updated head pose information. View 630 may be used to render a second image based on the adjusted image of the virtual object 604 for display.

In particular embodiments, the adjustments for rendering the second image can be computed as a two-dimensional transform for the first image (e.g., relative to the viewpoint of the user). For each sub-frame to be generated, the headset system 110 may simulate the effects of moving the first image in the three-dimensional virtual environment with a visual deformation or two-dimensional transform based on differences between the current hand pose and the hand pose used for rendering the first image. For example, rather than move the first image in the virtual environment, the headset system 110 may simply scale and translate the first image while rendering the second image in a manner that approximates the effect of moving the first image in the virtual environment. The adjustments applied to the first image before rendering the second image can include, by way of example only and not by limitation, scaling the first image, translating the first image along the x-axis or y-axis of the frame, rotation the first image along any axis, or shearing the first image. After applying the visual deformation, the headset system 110 can render and display the second image.

Figure 7:
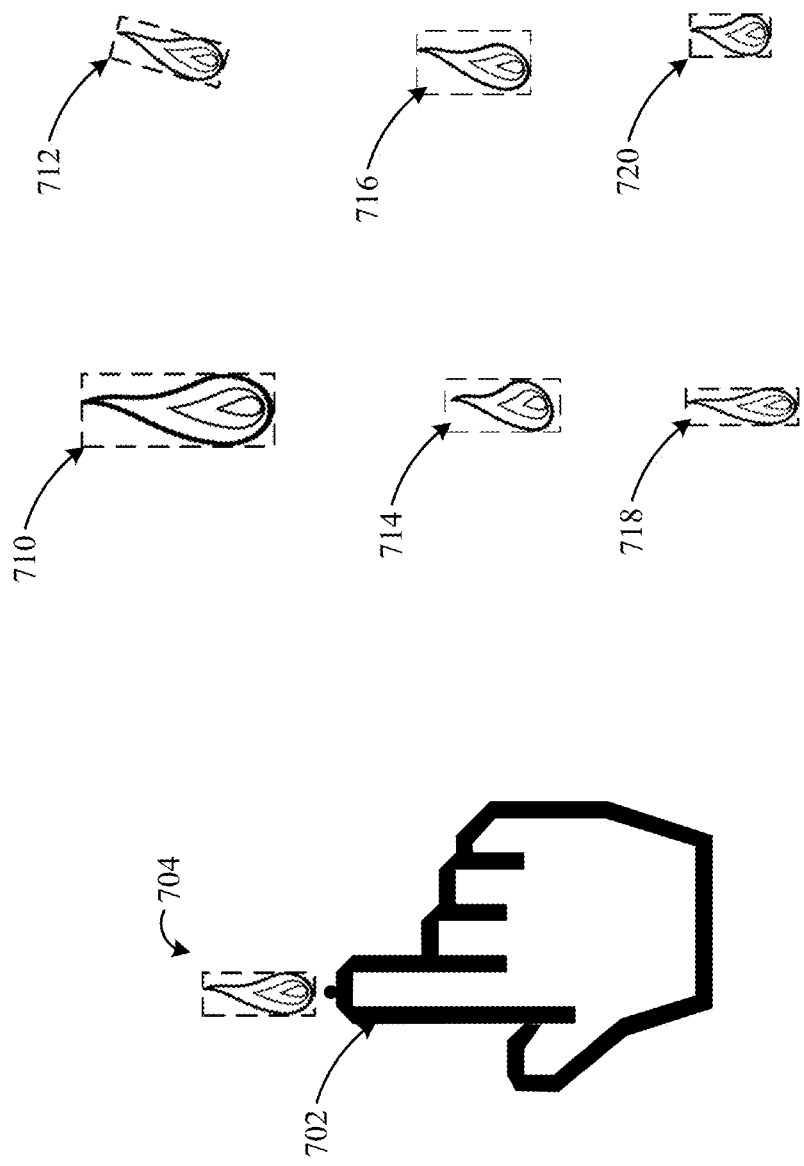
FIG. 7 illustrates an example of adjustments to a first image for rendering a second image.

FIG. 7 illustrates an example of adjustments that may be applied to a first image of a virtual object 704 that has been rendered based on a predetermined spatial relationship with a user's hand 702. As shown, the first image of the virtual object 704 has been rendered and prepared for display. In response to updated hand pose information, the headset system 110 can determine and apply a number of adjustments as two-dimensional transformations of the first image of the virtual object 704. Adjusted image 710 shows the first image 704 after it has been scaled up to make the first image 704 appear closer to the viewpoint, for example in response to the headset system 110 determining from the hand pose information that the user's hand 702 has moved closer to the user. Adjusted image 712 shows the first image 704 after it has been rotated along an axis perpendicular to the viewpoint, for example in response to the headset system 110 determining from the hand pose information that the user's hand 702 has rotated in a similar manner. Adjusted images 714 and 716 show the first image 704 after a horizontal or vertical skew or shear has been applied to the first image 704 to simulate the appearance of the first image 704 rotating along multiple axes simultaneously, for example in response to the headset system 110 determining from the hand pose information that the user's hand 702 has rotated in a similar manner. Adjusted image 718 and 720 shows the first image 704 after it has been scaled in the vertical and horizontal direction to make the first image 704 appear to have rotated along the x-axis and y-axis of the display of the user, for example in response to the headset system 110 determining from the hand pose information that the user's hand 702 has rotated along a similar axis to the user. Although FIG. 7 illustrates several adjustments that may be made to the first image 704, this is meant to be illustrative and not exclusive. Moreover, as appropriate, these adjustments and more may be combined in any suitable combination In both example approaches, the appearance of the virtual object shown in the first image may not be updated until another first image (e.g., another frame is rendered). For example, colors, text, and positions of components included in the first image may not be updated as each second image is prepared and rendered. Instead, the first image of the virtual object may be manipulated as a virtual object in the virtual environment. At the appropriate time for another frame to be rendered, the pose and appearance of the virtual object may both be updated based on a newly-reported pose of the hand and a newly-reported pose of the head.

At step 570, the headset system 110 may apply the determine adjustments to the first image. For example, if the adjustment involves a three-dimensional transform of the first image, the headset system 110 may move the first image in the virtual environment. As another example, if the adjustment involves a two-dimensional transform, the headset system 110 may apply said transform to the first image. Applying the determined adjustment may include creating a copy of the first image to preserve the first image for determining and applying subsequent adjustments.

Optionally, at step 575, the headset system 110 may be configured to update the appearance of the first image on a contextual basis. For example, the headset system 110 may update lighting conditions, shaders, the brightness of the first image if such updates are detected as required. As another example, the headset computing device may be configured to update the appearance of the virtual object if the headset computing device has available computational and energy resources. Because the headset computing device may be worn by the user, the artificial reality system 100 may be configured to distribute certain rendering tasks between the, e.g., stage computing system and headset system 110 based on metrics used to track efficiency of operations and available resources.

At step 580, the headset system 110 may render a second image based on the adjusted first image as viewed from the second viewpoint. At step 585, the headset system 110 may provide the second image for display. The headset system 110 may generate instructions based on the second image for the light emitters of the display of the headset system 110. The instructions may include the color value, color brightness or intensity, and any of variables effecting the display of the second image. The instructions may also include instructions for certain light emitters to stay unilluminated or turn off if needed. The intended effect is for the user to be able to see portions of the virtual environment (e.g., virtual objects in the virtual environment) from the viewpoint into the virtual environment mixed with portions of the real environment including the user's hands (which may be interacting with virtual objects in the virtual environment).

At step 590, the headset system 110 may determine whether a new first image has been provided (e.g., whether the stage computing system 120 has provided a new frame). If not, the method may proceed back to step 550 and repeat the process to render an additional second image (e.g., continuing sub-frame rendering). If there is a new first image, the headset system 110 may, at step 595, load the data from the new first image before proceeding to step 550.

Particular embodiments may repeat one or more steps of the method of FIGS. 5A-5B, where appropriate. Although this disclosure describes and illustrates particular steps of the method of FIGS. 5A-5B as occurring in a particular order, this disclosure contemplates any suitable steps of the method of FIGS. 5A-5B occurring in any suitable order. Moreover, although this disclosure describes and illustrates an example method for providing for hand-locked rendering of virtual objects in artificial reality with sub-frame rendering including the particular steps of the method of FIGS. 5A-5B, this disclosure contemplates any suitable method for providing for hand-locked rendering of virtual objects in artificial reality with sub-frame rendering including any suitable steps, which may include all, some, or none of the steps of the method of FIGS. 5A-5B, where appropriate. Furthermore, although this disclosure describes and illustrates particular components, devices, or systems carrying out particular steps of the method of FIGS. 5A-5B, this disclosure contemplates any suitable combination of any suitable components, devices, or systems carrying out any suitable steps of the method of FIGS. 5A-5B.

Figure 8:
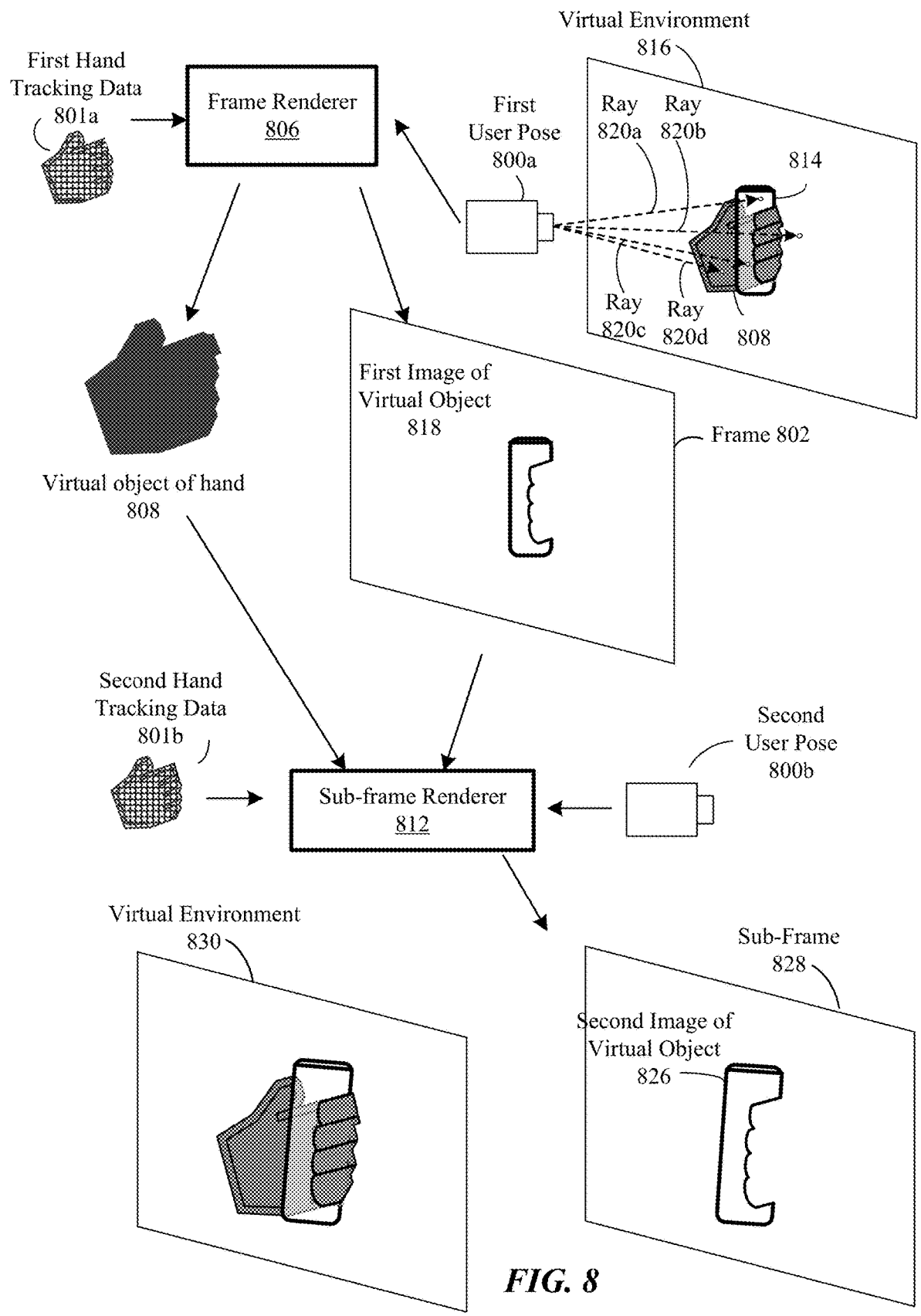
FIG. 8 illustrates a visual representation of generating images of a virtual environment.

FIG. 8 illustrates the process of generating an image of a virtual scene for a user according to the embodiments discussed herein. First, a camera of a headset system 110 captures an image of an environment of the user. The image includes an object, such as a user's hand, that will be used to anchor the position of virtual objects in the scene and may possibly occlude virtual objects in the scene. The headset system 110 also determines a first user pose 800a. The first user pose 800a may be determined from the captured image or images (e.g., using SLAM or another localizing technique). The first user pose 800a may be determined based on one or more on-board sensors of the headset system 110 (e.g., an inertial measurement unit or the tracking system 140 generally) to determine head tracking information. The headset system 110 or the stage computing system 120 may also perform hand tracking and generate or receive first hand tracking information 801a (e.g., from the tracking system 140). The first hand tracking information 801a may be used to determine a first hand pose of the user's hand. The first user pose 800a and first hand pose may be passed to a frame renderer 806 component for rendering first images (e.g., frames) of the virtual environment 816.

The frame renderer 806 (or related components) may generate a virtual object representation 808 of the user hand to be used for a frame 802 based on the first hand pose as described above. The virtual object representation 808 may be represented by a surface virtual object and include a two-dimensional opaque texture, height map, and other information necessary to represent the user's hand in the virtual environment 816, such as a location of the user's hand in the environment, boundaries of the surface 808, etc. As described above, the pose of the virtual object 814 may be anchored in the virtual environment 816 to the virtual object representation 808 of the user's hand based on a determination of one or more anchor points or one or more predetermined spatial relationships with the user's hand.

The frame renderer 806 may also generate a first image 818 of the virtual object 814 in the virtual environment 816. To generate the first image 818 of the virtual object 814, the frame renderer 806 may perform initial visibility determinations to determine which portions of the virtual object 814 are visible from the first user pose 800a. The visibility determination may encompass performing raycasting into the virtual environment 816 based on the first user pose 800a with the origin of each of several rays (e.g., rays 820a, 820b, 820c, and 820d) being based on a position in a display of the headset system 110 and the first user pose 800a. In particular embodiments, the raycasting may be similar to, or performed with, that performed by the transform blocks 220A and 220B of the display engine 112. In particular embodiments, occlusion determination may be supported or performed by the occlusion system 150.

For each ray used for visibility determinations, the frame renderer 806 may project the ray into the virtual environment 816 and determine whether the ray intersects with a surface in the virtual environment. In particular embodiments, depth testing (e.g., the determination of which surface is intersected first) may be performed on a per-surface level. That is, each surface may have a singular height or depth value that allows the frame renderer 806 (or, e.g., the transform blocks 220A and 220B) to quickly identify the interacting surface. For example, the frame renderer 806 may cast ray 820a into the virtual environment 816 and determine that the ray 820a intersects first with the virtual object 814. The frame renderer 806 may cast ray 820b into the virtual environment 816 and determine that the ray 820b intersects with the virtual object 814 at a point near the surface 808 corresponding to the hand of the user. The frame renderer may cast ray 820c into the virtual environment 816 and determine that the ray 820c first intersects with the surface 808 corresponding to the hand of the user. The frame renderer 806 may cast ray 820d into the virtual environment 816 and determine that the ray 820d does not intersect with any object in the virtual environment 816.

Each ray projected into the virtual environment 816 may correspond to one or more pixels of an image to be displayed to a user. The pixels corresponding to the ray may be assigned a color value based on the surface with which it intersects. For example, the pixels associated with rays 820a and 820b may be assigned color values based on the virtual object 814 (e.g., by sampling a texture value associated with the surface). The pixels associated with ray 820c may be assigned a color value based on the surface 808. In particular embodiment, the color value may be designated as both opaque (e.g., no blending will occur, or light will pass through) and dark or black to provide instructions to the light emitting components of the display that will eventually display the rendered image. The pixels associated with ray 820d may be assigned a default color. In particular embodiments, the default color may be similar to, or given the same value as, the value used for surface 808. This default color may be chosen to allow the user's environment to be visible when there are no virtual objects to display (e.g., if there is empty space).

The frame renderer 806 may use the visibility determinations and color values to render a first image of the virtual object 818 to be used as a frame 802. The first image of the virtual object 818 may be a surface object that include occlusion information relating to the user's hand through the analysis involving the virtual object representation of the hand 808. The frame renderer 806 may perform the calculations necessary to produce this information to support a first frame rate (e.g., 30 or 60 fps). The frame renderer 806 may pass all this information to the sub-frame renderer 812 (e.g., via a wireless connection if the frame renderer 806 is embodied in the stage computing system 120).

The sub-frame renderer 812 may receive the first image of the virtual object 818 and the virtual object representation 808 of the hand of the user. The sub-frame renderer 512 may also receive or determine a second user pose 800b (e.g., from the tracking system 140). The second user pose 800b may differ from the first user pose 800a because, even though the first user pose 800a is updated with every generated frame (e.g., every first image), the user may move slightly before the frame or related sub-frames and generated and displayed. Failure to account for the updated pose of the user may dramatically increase user discomfort while using the artificial reality system 100. Similarly, the sub-frame renderer 812 may receive or determine second hand tracking information 801b (e.g., from the tracking system 140). As with the user pose, the user's hand pose may change after the first image of the virtual object 818 is generated but before the image and related frames (e.g., frame 802) can be generated and displayed. The second hand tracking information 801b may include newly updated hand tracking data, or may include differences (e.g., deltas) between the first hand tracking information 801a and hand tracking data collected since the frame 802 was generated.

The sub-frame renderer 812 (or related components) may determine and apply adjustments to the first image of the virtual object 818 to generate a related second image 826 of the virtual object. The second image 826 of the virtual object may account for differences between the first user pose 800*a* and the second user pose 800*b* and the first user hand tracking information 801*a* and the second user hand tracking information 801*b*. As shown in the second virtual environment 830, the user's hand has moved slightly, based on the second hand tracking information 801*b*, appropriate adjustments to the first image of the virtual object 818 have been calculated. In particular embodiments, the color values associated with the first image 818 may also be updated. The adjustments may be applied to the first image 818 and the he color value determinations made for each of the rays may be used by the sub-frame renderer 812 to render the second image 826 for display. In particular embodiments, this may include appropriate steps performed by the pixel blocks 230A and 230B and the display blocks 240A and 240B of the display engine 112. The sub-frame renderer 812 may composite the determined pixel color values to prepare a sub-frame 828 for display to the user. The sub-frame 828 may include the second image 826 of the virtual object appearing to include a cut-out for the user's hand. When displayed by the display components of the headset system 110, the cut-out may allow the user's hand to actually appear in place of the virtual object 808. Thus, the user will be able to perceive their actual hand interacting with the virtual object 814, and the virtual object will be anchored appropriately based on the predetermined spatial relationship. The sub-frame renderer may repeat its processes several times for each frame 802 and first image of the virtual object 818 that is produced, with the second hand tracking information 801*b* and the second user pose 800*b* being updated for each sub-frame.

Figure 9:
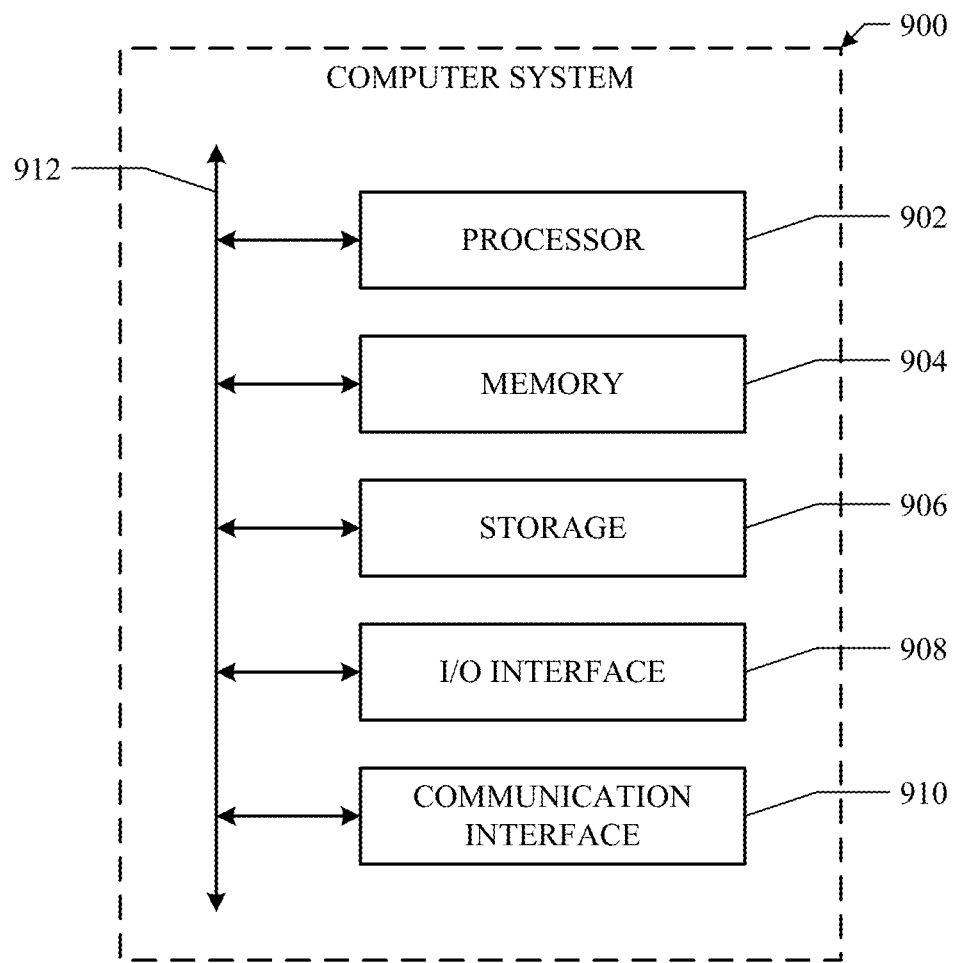
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The claims:

1. A method comprising, by one or more computing devices:
    determining, based on first tracking data associated with a first time, a first viewpoint of a user and a first hand pose of a hand of the user;
    generating a virtual object in a virtual environment based on the first hand pose and a predetermined spatial relationship between the virtual object and the hand of the user;
    rendering a first image of the virtual object as viewed from the first viewpoint;
    determining, based on second tracking data associated with a second time, a second viewpoint of the user and a second hand pose of the hand;
    adjusting the first image of the virtual object based on changes from the first hand pose to the second hand pose;
    determining a portion of the virtual object occluded by the hand from the second viewpoint;
    rendering a second image based on the adjusted first image as viewed from the second viewpoint, wherein rendering the second image based on the adjusted first image as viewed from the second viewpoint comprises generating instructions to not display a portion of the second image corresponding to the portion of the virtual object occluded by the hand; and
    displaying the second image.

2. The method of claim 1, wherein the predetermined spatial relationship between the virtual object and the hand of the user is based on one or more anchor points relative to the hand of the user.

3. The method of claim 1, further comprising:
    determining, based on the first tracking data associated with the first time, a first head pose of a head of the user; and
    wherein generating the virtual object in the virtual environment is further based on the first head pose.

4. The method of claim 3, further comprising:
    determining, based on the second tracking data associated with the second time, a second head pose of a head of the user; and
    wherein adjusting the first image of the virtual object is further based on changes from the first head pose to the second head pose.

5. The method of claim 1, wherein adjusting the first Image of the virtual object comprises:
    computing a three-dimensional transform for the first image of the virtual object in the virtual environment based on the changes from the first hand pose to the second hand pose; and
    applying the three-dimensional transform to the first image of the virtual object in the virtual environment; and
    wherein rendering the second image based on the adjusted first image comprises generating a projection of the adjusted first image of the virtual object based on the second viewpoint.

6. The method of claim 1, wherein adjusting the first Image of the virtual object comprises:
    computing a visual deformation for the first image of the virtual object based on the changes from the first hand pose to the second hand pose; and
    applying the visual deformation to the first image of the virtual object; and
    wherein rendering the second image based on the adjusted first image comprises rendering the deformed first image of the virtual object based on the second viewpoint.

7. The method of claim 6, wherein the visual deformation comprises:
    scaling the first image of the virtual object;
    skewing the first image of the virtual object;
    rotating the first image of the virtual object;
    or shearing the first image of the virtual object.

8. The method of claim 1, wherein rendering the second image based on the adjusted first image as viewed from the second viewpoint comprises:
    updating a visual appearance of the first image of the virtual object based on the changes from the first hand pose to the second hand pose.

9. The method of claim 1, wherein determining the portion of the virtual object occluded by the hand from the second viewpoint comprises: generating a virtual object representation of the hand in the virtual environment, the position and orientation of the virtual object representation of the hand being based on the second tracking data and the second viewpoint; projecting a ray into the virtual environment with an origin and a trajectory based on the second viewpoint; and determining a point of intersection of the ray with the virtual object representation of the hand, wherein the ray intersects with the virtual object representation of the hand before intersecting with another virtual object.

10. The method of claim 1, wherein:
    the first image of the virtual object as viewed from the first viewpoint is rendered by a first computing device of the one or more computing devices; and the second image based on the adjusted first image as viewed from the second viewpoint is rendered by a second computing device of the one or more computing devices.

11. The method of claim 1, wherein one of the one or more computing devices comprises a head-mounted display.

12. The method of claim 11, further comprising:
allocating the steps of the method between the computing device comprising the head-mounted display and another computing device of the one or more computing devices based on one or more metrics of available computing resources.

13. The method of claim 1, further comprising, after rendering the second image based on the adjusted first image as viewed from the second viewpoint:
determining, based on third tracking data associated with a third time, a third viewpoint of the user and a third hand pose of the hand;
adjusting the first image of the virtual object based on changes from the first hand pose to the third hand pose;
rendering a third image based on the adjusted first image as viewed from the third viewpoint; and
displaying the third image.

14. A system comprising: one or more processors; and one or more computer-readable non-transitory storage media in communication with the one or more processors and comprising instructions, that when executed by the one or more processors, are configured to cause the system to perform operations comprising:
determining, based on first tracking data associated with a first time, a first viewpoint of a user and a first hand pose of a hand of the user;
generating a virtual object in a virtual environment based on the first hand pose and a predetermined spatial relationship between the virtual object and the hand of the user;
rendering a first image of the virtual object as viewed from the first viewpoint;
determining, based on second tracking data associated with a second time, a second viewpoint of the user and a second hand pose of the hand;
adjusting the first image of the virtual object based on changes from the first hand pose to the second hand pose;
determining a portion of the virtual object occluded by the hand from the second viewpoint;
rendering a second image based on the adjusted first image as viewed from the second viewpoint, wherein rendering the second image based on the adjusted first image as viewed from the second viewpoint comprises generating instructions to not display a portion of the second image corresponding to the portion of the virtual object occluded by the hand; and
displaying the second image.

15. The system of claim 14, wherein the predetermined spatial relationship between the virtual object and the hand of the user is based on one or more anchor points relative to the hand of the user.

16. The system of claim 14, wherein the instructions are further configured to cause the system to perform operations further comprising:
determining, based on the first tracking data associated with the first time, a first head pose of a head of the user; and
wherein generating the virtual object in the virtual environment is further based on the first head pose.

17. The system of claim 14, wherein the instructions are further configured to cause the system to perform operations further comprising:
determining, based on the second tracking data associated with the second time, a second head pose of a head of the user; and
wherein adjusting the first image of the virtual object is further based on changes from the first head pose to the second head pose.

18. One or more computer-readable non-transitory storage media including instructions that, when executed by one or more processors of a computing system, are configured to cause the one or more processors to perform operations comprising:
determining, based on first tracking data associated with a first time, a first viewpoint of a user and a first hand pose of a hand of the user;
generating a virtual object in a virtual environment based on the first hand pose and a predetermined spatial relationship between the virtual object and the hand of the user;
rendering a first image of the virtual object as viewed from the first viewpoint;
determining, based on second tracking data associated with a second time, a second viewpoint of the user and a second hand pose of the hand;
adjusting the first image of the virtual object based on changes from the first hand pose to the second hand pose;
determining a portion of the virtual object occluded by the hand from the second viewpoint;
rendering a second image based on the adjusted first image as viewed from the second viewpoint, wherein rendering the second image based on the adjusted first image as viewed from the second viewpoint comprises generating instructions to not display a portion of the second image corresponding to the portion of the virtual object occluded by the hand; and
displaying the second image.

19. The one or more computer-readable non-transitory storage media of claim 18, wherein the predetermined spatial relationship between the virtual object and the hand of the user is based on one or more anchor points relative to the hand of the user.

20. The one or more computer-readable non-transitory storage media of claim 18, wherein the instructions are further configured to cause the one or more processors to perform operations further comprising:
determining, based on the first tracking data associated with the first time, a first head pose of a head of the user; and
wherein generating the virtual object in the virtual environment is further based on the first head pose.

* * * * *